(12) United States Patent
Takeuchi et al.

(10) Patent No.: US 8,023,056 B2
(45) Date of Patent: Sep. 20, 2011

(54) ACTIVE MATRIX SUBSTRATE, DISPLAY DEVICE, AND TELEVISION RECEIVER

(75) Inventors: Masanori Takeuchi, Tsu (JP); Toshihide Tsubata, Tsu (JP)

(73) Assignee: Sharp Kabushiki Kaisha, Osaka (JP)

( * ) Notice: Subject to any disclaimer, the term of this patent is extended or adjusted under 35 U.S.C. 154(b) by 293 days.

(21) Appl. No.: 12/279,029

(22) PCT Filed: Nov. 14, 2006

(86) PCT No.: PCT/JP2006/322676
§ 371 (c)(1),
(2), (4) Date: Nov. 19, 2008

(87) PCT Pub. No.: WO2007/097078
PCT Pub. Date: Aug. 30, 2007

(65) Prior Publication Data
US 2009/0091676 A1   Apr. 9, 2009

(30) Foreign Application Priority Data
Feb. 24, 2006   (JP) .................................. 2006-049362

(51) Int. Cl.
*G02F 1/136* (2006.01)
*G02F 1/1333* (2006.01)
(52) U.S. Cl. .............................. 349/43; 349/42; 349/138
(58) Field of Classification Search .............. 349/38–43, 349/138–139
See application file for complete search history.

(56) References Cited

U.S. PATENT DOCUMENTS
5,380,555 A   1/1995 Mine et al.
6,274,516 B1   8/2001 Kamei et al.
7,605,416 B2 * 10/2009 Hong et al. .................... 257/293
2005/0162599 A1   7/2005 Kurihara
2005/0255622 A1   11/2005 Kokura et al.

FOREIGN PATENT DOCUMENTS
| JP | 06-112485 | 4/1994 |
| JP | 10-102003 | 4/1998 |
| JP | 11-133457 | 5/1999 |
| JP | 2001-098224 | 4/2001 |
| JP | 2002-123192 | 4/2002 |
| JP | 2005-242306 | 9/2005 |
| WO | 2003/088193 | 10/2003 |

OTHER PUBLICATIONS

International Search Report for PCT/JP2006/322676 mailed Feb. 20, 2007.
Choi et al., "Performance of TFT passivated with low-K dielectrics", *IDW '03*, pp. 617-620.

* cited by examiner

*Primary Examiner* — Dung T. Nguyen
(74) *Attorney, Agent, or Firm* — Nixon & Vanderhye P.C.

(57) ABSTRACT

An active matrix substrate including, in each pixel area, a transistor, a pixel electrode (17), a conductive member (18) functioning as one of electrodes of a storage capacitor, a drain lead-out (7) electrode connected to a drain electrode of the transistor, and overlapping with the conductive member (18), and a contact hole for connecting the drain lead-out electrode (7) to the pixel electrode (17), includes a gate insulating film (40) covering a gate electrode of each transistor, the gate insulating film including a first thickness portion (41) overlapping with at least part of the contact hole, and a second thickness portion (42) formed adjacent to the first thickness portion, and overlapping with the drain lead-out electrode, the first thickness portion (41) having a greater thickness than the second thickness portion (42). This makes it possible to provide the active matrix substrate in which a short-circuit between the conductive member functioning as one of the electrodes of the storage capacitor, and the drain lead-out electrode (or the pixel electrode) is successfully prevented.

15 Claims, 14 Drawing Sheets

THICKNESS OF HIGH RESISTANCE
SEMICONDUCTOR LAYER 24a

FIG. 16 (a) (Prior Art)
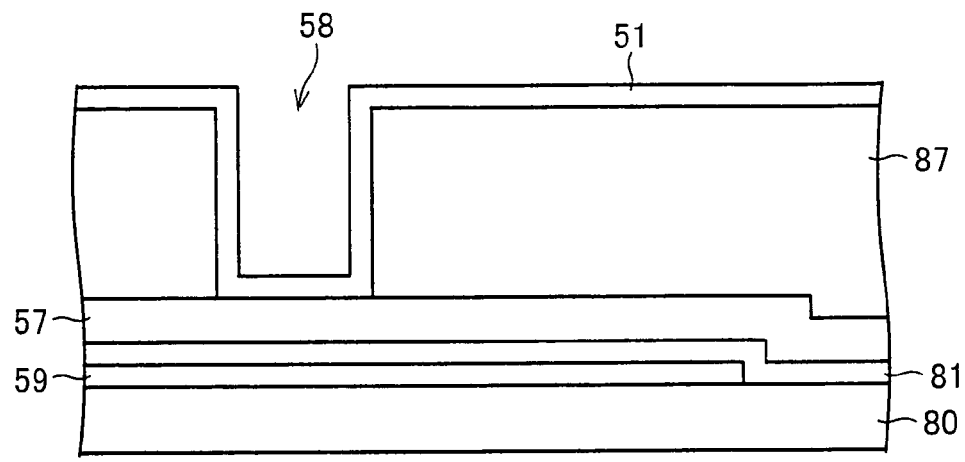
FIG. 16 (b) (Prior Art)
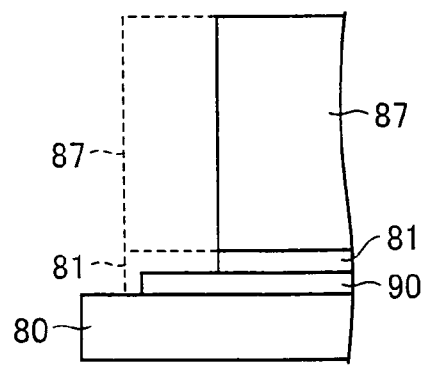

ACTIVE MATRIX SUBSTRATE, DISPLAY DEVICE, AND TELEVISION RECEIVER

This application is the U.S. national phase of International Application No. PCT/JP2006/322676 filed 14 Nov. 2006 which designated the U.S. and claims priority to Japanese Patent Application No. 2006-49362 filed 24 Feb. 2006, the entire contents of which are hereby incorporated by reference.

TECHNICAL FIELD

The present invention relates to a display device, such as a liquid crystal display device, various EL display devices and the like, and an active matrix substrate for use in the display device.

BACKGROUND ART

FIG. 15 is a plan view illustrating a conventional active matrix substrate. As illustrated in FIG. 15, in each pixel area 50, its pixel electrode 51 is surrounded by a scanning signal line 52 for supplying a scanning signal, and a data signal line 53 for supplying a data signal. The scanning signal line 52 and the data signal line 53 intersect each other. Further, a TFT (Thin Film Transistor) 54 is provided at an intersection of the scanning signal line 52 and the data signal line 53. The scanning signal line 52 is connected to a gate electrode 55 of the TFT 54, and driving of the TFT 54 is controlled by the scanning signal inputted into the gate electrode 55. The data signal line 53 is connected to a source electrode 66a of the TFT 54, and the data signal is inputted into the source electrode 66a. Further, a drain lead-out wire 56 is connected to a drain electrode 66b of the TFT 54. Furthermore, a storage capacitor wire 59 is provided in the pixel area 50 so as to (i) prevent a liquid crystal layer from self-discharging while the TFT is off, (ii) prevent picture signal deterioration caused by off-current of the TFT, and (iii) be used, for example, as a pathway of various modulation signals for driving liquid crystal.

The drain electrode 66b of the TFT 54 is connected to a storage capacitor electrode 57 (a drain lead-out electrode) via the drain lead-out wire 56, which storage capacitor electrode 57 overlaps with the storage capacitor wire 59. The storage capacitor electrode 57 is connected to the pixel electrode 51 via a contact hole 58. The storage capacitor electrode 57 (the drain lead-out electrode) and the storage capacitor wire 59 form a storage capacitor in cooperation.

FIG. 16(a) is a cross-sectional view illustrating the conventional active matrix substrate with the contact hole. FIG. 16(b) is a cross-sectional view illustrating the conventional active matrix substrate including a driver connecting terminal.

As illustrated in FIG. 16(a), in the vicinity of the contact hole in the pixel area, the storage capacitor wire 59, a gate insulating film 81, the drain lead-out electrode 57, an interlayer insulating film 87, and the pixel electrode 51 are formed on a substrate 80 in this order. An area of the interlayer insulating film 87 is removed (etched away), to which area the contact hole is to be formed, so as to form the contact hole 58. This connects the pixel electrode 51 with the drain electrode 57.

Meanwhile, in the vicinity of the driver connecting terminal located at an edge of the active matrix substrate, as illustrated in FIG. 16(b), a driver connecting terminal 90, a gate insulating film 81, and the interlayer insulating film 87 are formed on the substrate 80 in this order. Thereafter, the gate insulating film 81 and the interlayer insulating film 87, both of which are positioned above the driver connecting terminal 90, are etched away so that the driver connecting terminal 90 is exposed outside, and then connected with various drivers (drive devices).

(Patent Document 1)
Japanese Unexamined Patent Application Publication No. 11-133457 (published on May 21, 1999)
(Patent Document 2)
Japanese Unexamined Patent Application Publication No. 11-135622 (published on May 21, 1999)
(Patent Document 3)
Japanese Unexamined Patent Application Publication No. 6-112485 (published on Apr. 22, 1994)

DISCLOSURE OF INVENTION

It has been attempted to simultaneously carry out an etching step for forming the contact hole and another etching step for exposing the driver connecting terminal on the substrate in a single etching step. In this etching step, the interlayer insulating film is etched away in an area to be an opening of the contact hole, and is also simultaneously removed in another area (an edge of the active matrix substrate) where the driver connecting terminal is to be formed. This etching is carried out up to the drain lead-out electrode in the area to be the opening of the contact hole, and is carried out up to the driver connecting terminal in the area where the driver connecting terminal is formed.

However, in this case where the interlayer insulating film and also the gate insulating film are etched in the area where the driver connecting terminal is formed, and the interlayer insulating film is simultaneously etched in the area in the contact hole, if the drain lead-out electrode located below (at the bottom of) the contact hole has a formation defect (such as a pinhole), the gate insulating film positioned below the drain lead-out electrode would be also removed (etched away). This would cause a short-circuit between the drain lead-out electrode (or the pixel electrode) and the storage capacitor wire.

Further, there is a case where the drain lead-out electrode located below the contact hole is hollowed in advance, for example, a case where the drain lead-out electrode has a two layer structure in which an upper layer is made of a material (such as AL) that will cause electric corrosion with the pixel electrode (an ITO). In this case, there is no drain lead-out electrode (which acts as an etching stopper) below (at the bottom of) the contact hole. Therefore, a semiconductor layer is arranged to be left in the opening of the contact hole, and then etched, so as to prevent the gate insulating film from being removed (etched away). However, a thickness of the semiconductor layer and a thickness of the gate insulating film are not uniform so that, for example, when the etching is carried out with respect to an area where both the semiconductor layer and the gate insulating film are partially thin, this would cause the short-circuit between the drain lead-out electrode (or the pixel electrode) and the storage capacitor wire. Note that it is not possible to avoid the over-etching by making this semiconductor layer thick, because this semiconductor layer and another semiconductor layer that is to become a channel of the TFT are simultaneously formed. This arrangement would result in poorer TFT characteristics.

The present invention is made in view of the problems. An object of the present invention is to provide an active matrix substrate, with which it is possible to successfully prevent a short-circuit between a conductive member (such as a storage capacitor wire) functioning as one of electrodes of a storage capacitor, and a drain lead-out electrode (or a pixel electrode).

An active matrix substrate including, in each pixel area, a transistor, a pixel electrode, a conductive member functioning as one of electrodes of a storage capacitor, a drain lead-out electrode connected to a drain electrode of the transistor, and overlapping with the conductive member, and a contact hole for connecting the drain lead-out electrode to the pixel electrode, includes a gate insulating film covering a gate electrode of each transistor, and the conductive member, the gate insulating film including a first thickness portion overlapping with at least part of the contact hole, and a second thickness portion formed adjacent to the first thickness portion, and overlapping with the drain lead-out electrode, the first thickness portion having a greater thickness than the second thickness portion. Further, an active matrix substrate according to the present invention, wherein, in each pixel area, a drain lead-out electrode is connected to a drain electrode of a transistor, and overlaps, via a gate insulating film (for covering a gate electrode of a transistor), with a conductive member functioning as one of electrodes of a storage capacitor, and is connected to a pixel electrode via a contact hole located on the conductive member, wherein the gate insulating film have an area below an opening of the contact hole, which area is at least partially thicker than its surrounding area (adjacent areas).

In this arrangement, the first thickness portion and the second thickness portion are formed to the gate insulating film which is positioned on the conductive member (the conductive member functioning as one of the electrodes of the storage capacitor), the first thickness portion overlapping with the contact hole and having a long thickness, the second thickness portion formed adjacent to the first thickness portion (for example, around the first thickness portion) and having a shorter thickness than the first thickness portion. The second thickness portion having a relatively short thickness is formed so that a large capacitor (a storage capacitor) can be formed between the conductive member and the drain lead-out electrode.

In this arrangement, there is a thick gate insulating film (the first thickness portion) below the contact hole so that, even if the drain lead-out electrode (an area below the contact hole) has a formation defect, it is possible to prevent a short-circuit between the conductive member functioning as one of the electrodes of the storage capacitor and the drain lead-out electrode (or the pixel electrode).

Further, as described above, in a case where there is no drain lead-out electrode below (at the bottom of) the contact hole, there is the thick gate insulating film (the first thickness portion) below the contact hole. Thereby, it is not necessary to form a semiconductor layer there. Furthermore, in a case where the semiconductor layer has been formed, it is also possible to prevent the short-circuit between the conductive member and the drain lead-out electrode (or the pixel electrode), which short-circuit caused by an irregularity of the thickness of the semiconductor layer. Furthermore, it is also possible to arbitrarily determine a thickness of another semiconductor layer formed to the channel section, which semiconductor layer and this semiconductor layer (formed to the area where the contact hole is formed) are simultaneously formed, because it is not necessary to form this semiconductor layer to the area where the contact hole is formed. This results in an improvement in transistor characteristics.

The active matrix substrate according to the present invention is preferably arranged to include a third thickness portion located around the second thickness portion but not overlapping with the drain lead-out electrode, and having a greater thickness than the second thickness portion. In this arrangement, the gate insulating film (the second thickness portion) located above the conductive member is formed thinner than an area (the third thickness portion) not located above the conductive member, so as to have a larger storage capacitor.

In the active matrix substrate according to the present invention, the conductive member may be either the storage capacitor wire or an upstream or downstream scanning signal line.

In the active matrix substrate according to the present invention, it is preferable that, below the opening of the contact hole, there are an area where the drain lead-out electrode is formed, and another area where the drain lead-out electrode is not formed. With this arrangement, for example, it is possible to have an arrangement wherein the drain lead-out electrode has a laminated structure in which a first metal layer and a second metal layer are laminated, and, in the contact hole, the first metal layer touches the pixel electrode but the second metal layer does not touch the pixel electrode. This makes it possible that the drain lead-out electrode as the second metal layer is made of metal that will cause electric corrosion with the pixel electrode (an ITO), such as Al. Note that the area where the drain lead-out electrode is formed may be arranged such that the first metal layer is formed on the gate insulating film with the semiconductor layer therebetween, and the first metal layer touches the pixel electrode. As such, the semiconductor layer is arranged to be left in the area where the contact hole is formed so that it becomes possible to control how deep the etching for forming the contact hole proceeds. Thereby, the short-circuit between the conductive member and the drain lead-out electrode (or the pixel electrode) is successfully prevented. Further, the semiconductor layer may have a laminated structure in which a high resistance semiconductor layer and a low resistance semiconductor layer are laminated, which high resistance semiconductor layer is located nearer from the gate insulating film than the low resistance semiconductor layer, so as to make it possible to lower contact resistance. Furthermore, the area where the drain lead-out electrode is formed may be arranged such that the first metal layer is formed directly on the gate insulating film and touches the pixel electrode. With this arrangement, no semiconductor layer is formed to the area where the contact hole is formed so that it becomes possible to arbitrarily determine the thickness of another semiconductor layer that is formed to the channel section, both of the semiconductor layers formed simultaneously. This results in an improvement in transistor characteristics. Note that with the arrangement according to the present invention, even if no semiconductor layer is formed, there is the thick gate insulating film (the first thickness portion) below the contact hole so that the short-circuit between the conductive member and the drain lead-out electrode (or the pixel electrode) hardly occurs.

In the active matrix substrate according to the present invention, the first thickness portion constituted by a first gate insulating layer, and the second thickness portion may be constituted by a second gate insulating layer. Moreover, the first thickness portion may be constituted by both the first gate insulating layer and the second gate insulating layer, and the second thickness portion may be constituted by the second gate insulating layer. In this case, the first gate insulating layer is preferably made of an SOG (Spin On Glass) material, and formed on the substrate.

In the active matrix substrate according to the present invention, it is preferable that the driver connecting terminal, which is to be connected with the conductive member or various signal lines, is provided, and the contact hole is formed in a single etching step for etching the gate insulating film and an interlayer insulating film away to expose the driver connecting terminal and for etching the contact hole, the gate insulating film and the interlayer insulating film being located above the driver connecting terminal. As such, with the arrangement according to the present invention, there is the thick gate insulating film (the first thickness portion) below the contact hole so that the short-circuit between the conductive member and the drain lead-out electrode (or the pixel electrode) is successfully prevented, and at the same time, a step for exposing the driver connecting terminal (at the edge of the substrate) and a step for forming the contact hole in a pixel are simultaneously carried out in a single etching step. This makes it possible to reduce steps in the process of manufacturing.

The active matrix substrate according to the present invention may have an arrangement in which the gate insulating film is constituted by a plurality of gate insulating layers, and the second thickness portion has more than one gate insulating layer, and the first thickness portion has more gate insulating layers than the second thickness portion. In this case, it is preferable that the gate insulating layer includes an organic matter. As a material including an organic matter, an SOG (Spin On Glass) material, acrylic resin, epoxy resin, polyimide resin, polyurethane resin, polysiloxane resin, and novolac resin are applicable. It is relatively easy to form a film by microns with these materials, because these materials can be formed into a film by being coated to the substrate. As such, it becomes possible to take a longer distance, for example, between a conductive layer and other wires, and between the storage capacitor wire and other wires, which conductive layer and storage capacitor wire are connected with the scanning signal line. As such, the short-circuit is successfully prevented.

The active matrix substrate according to the present invention can have an arrangement in which the interlayer insulating film made of an organic matter is formed between the gate insulating film and the pixel electrode, and is etched away in the step for forming the contact hole.

Moreover, the active matrix substrate according to the present invention can have an arrangement in which a terminal (such as the driver connecting terminal), which is connected with the conductive member or various signal lines, is provided at the edge of the active matrix substrate, and the interlayer insulating film (made of an organic matter) located above the terminal is etched away in the step for exposing the terminal.

Further, a display device according to the present invention includes any active matrix substrate described above.

Furthermore, a television receiver according to the present invention includes the display device and a tuner section for receiving a television broadcast.

As described above, the active matrix substrate according to the present invention includes the thick gate insulating film (the first thickness portion) below the contact hole. Accordingly, in a case where there is the drain lead-out electrode below the contact hole, it is possible to prevent the short-circuit between the conductive member functioning as one of the electrodes of the storage capacitor, and the drain lead-out electrode (or the pixel electrode), even if the drain lead-out electrode has a formation defect. Moreover, even if there is no drain lead-out electrode below the contact hole, it is not necessary to form the semiconductor layer (for decelerating the etching) there, because there is the thick gate insulating film (the first thickness portion) below the contact hole. With this arrangement, it becomes possible to (i) successfully prevent the short-circuit between the conductive member and the drain lead-out electrode (or the pixel electrode), and at the same time, to (2) improve the transistor characteristics by arbitrarily determine the thickness of another semiconductor layer at the channel section.

BRIEF DESCRIPTION OF DRAWINGS

FIG. 16(a) is a cross-sectional view illustrating an arrangement of the conventional active matrix substrate.

FIG. 16(b) is a cross-sectional view illustrating an edge structure of the active matrix substrate illustrated in FIG. 16(a).

DESCRIPTION OF SIGNS

7. DRAIN LEAD-OUT ELECTRODE
7a. FIRST METAL LAYER
7b. SECOND METAL LAYER

6. GATE ELECTRODE
8. DRAIN ELECTRODE
9. SOURCE ELECTRODE
10. ACTIVE MATRIX SUBSTRATE
11. CONTACT HOLE
12. TFT (TRANSITOR)
15. DATA SIGNAL LINE
16. SCANNING SIGNAL LINE
17. PIXEL ELECTRODE
18. STORAGE CAPACITOR WIRE
21. FIRST GATE INSULATING LAYER
22. SECOND GATE INSULATING LAYER
24. SEMICONDUCTOR LAYER
24a. HIGH RESISTANCE SEMICONDUCTOR LAYER (i LAYER)
24b. LOW RESISTANCE SEMICONDUCTOR LAYER (n+LAYER)
40. GATE INSULATING FILM
41. FIRST THICKNESS PORTION
42. SECOND THICKNESS PORTION
43. THIRD THICKNESS PORTION
116f, 116b. UPSTREAM (DOWNSTREAM) SCANNING SIGNAL LINE

BEST MODE FOR CARRYING OUT THE INVENTION

First Embodiment

A first embodiment of the present invention is described below with reference to FIGS. 1 through 5.

Figure 1:
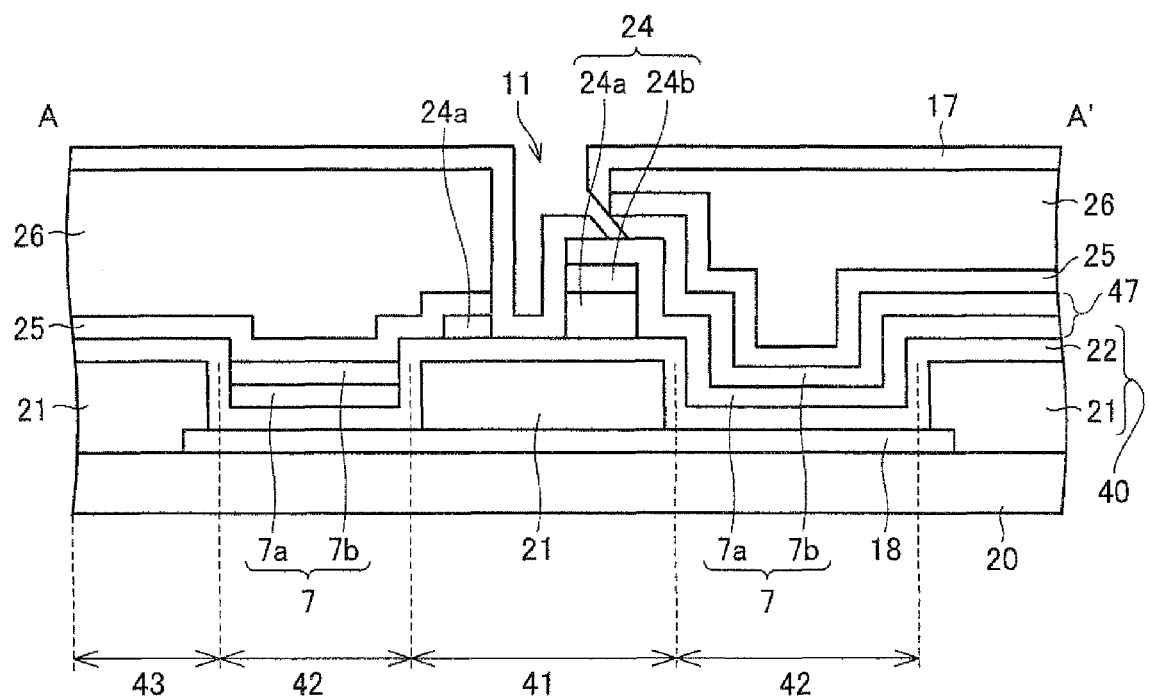
FIG. 1(a) is a cross-sectional view illustrating an arrangement of an active matrix substrate in accordance with a first embodiment.
FIG. 1(b) is a cross-sectional view illustrating an edge structure of the active matrix substrate illustrated in FIG. 1(a).
Figure 1:
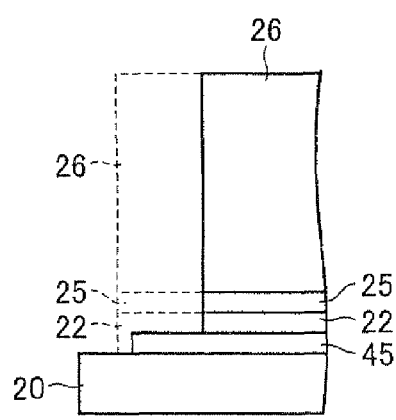
Figure 2:
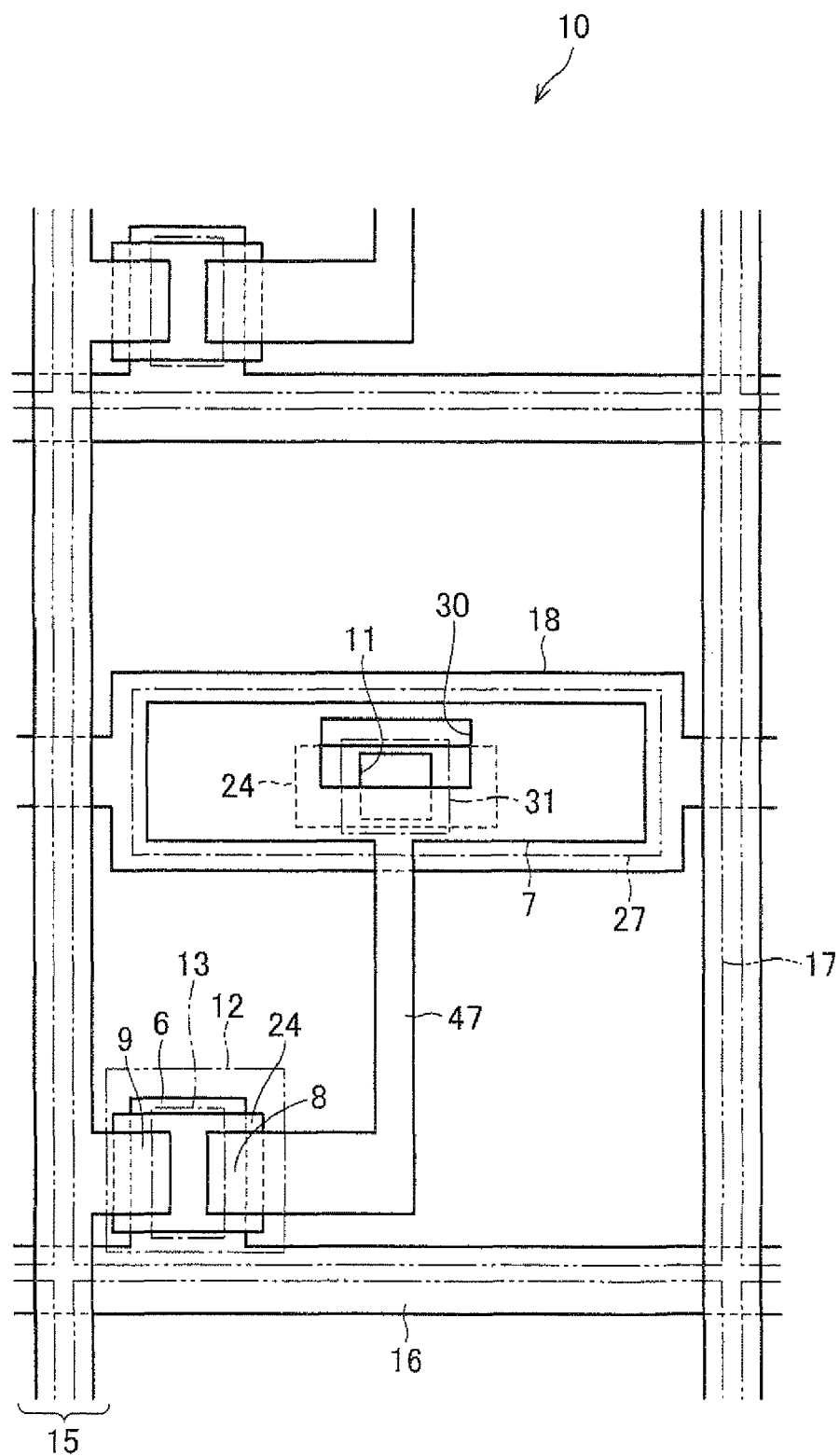
FIG. 2 is a plan view illustrating an arrangement of the active matrix substrate according to the present invention.
Figure 3:
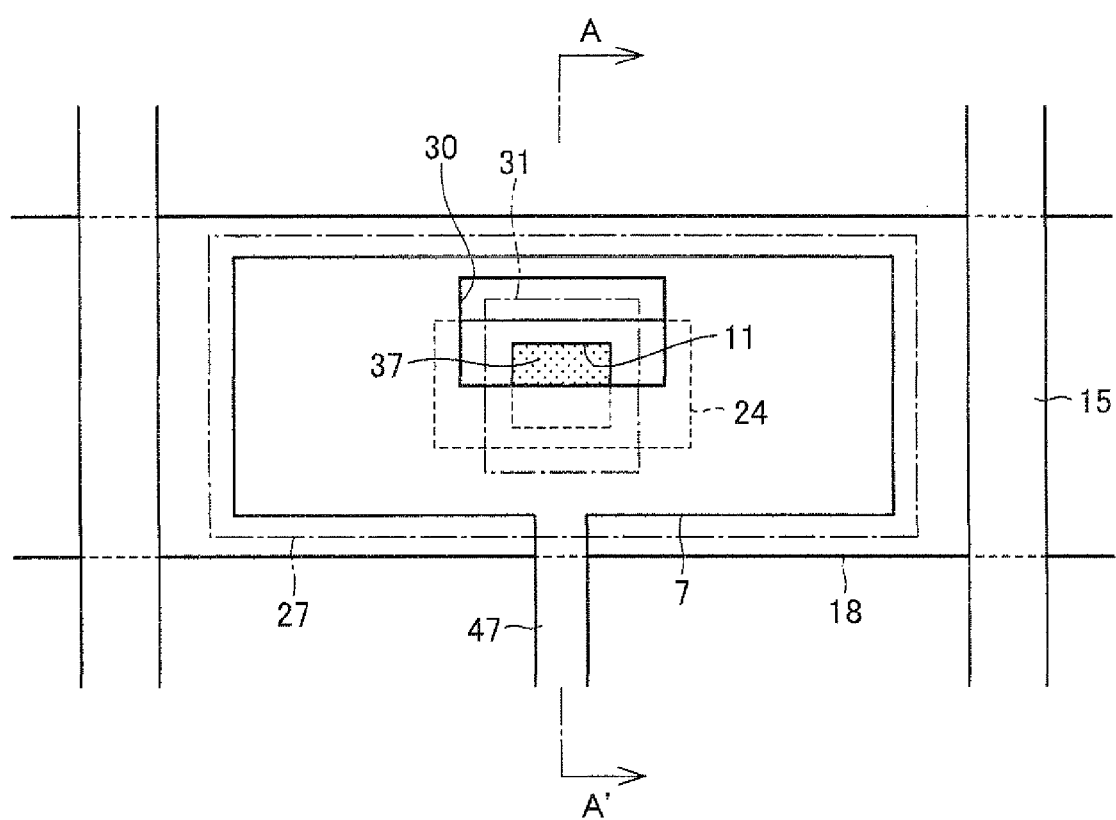
FIG. 3 is an enlarged plan view illustrating an arrangement of a main part of the active matrix substrate according to the present invention.

FIG. 2 is a plan view schematically illustrating an arrangement of an active matrix substrate 10 in accordance with the present embodiment, and FIG. 3 is an enlarged view illustrating the vicinity of a storage capacitor wire of the active matrix substrate illustrated in FIG. 1, and FIG. 1 is a cross-sectional view taken along the line A-A' in FIG. 3.

The active matrix substrate 10 includes, as illustrated in FIG. 2, a scanning signal line 16 formed in a horizontal direction in FIG. 2, a data signal line 15 formed in a perpendicular direction in FIG. 2, both of which are formed so as to orthogonalize each other, a TFT 12 (Thin Film Transistor) formed in the vicinity of each intersection of these two lines (15 and 16), and a pixel electrode 17. The TFT 12 includes a source electrode 9 which is connected with the data signal line 15, and a drain electrode 8 which is connected with the pixel electrode 17 via a drain lead-out wire 47, a drain lead-out electrode 7, and a contact hole 11. Further, a gate electrode 6 of the TFT 12 is connected with the scanning signal line 16. The pixel electrode 17 is a transparent electrode such as an ITO, and transmits light (light from a backlight) from below the active matrix substrate 10.

In the active matrix substrate 10, a scanning signal (gate on-voltage), which is inputted into the scanning signal line 16, turns the TFT 12 on (which means that the source electrode 9 and the drain electrode 8 are conducted). In this state, a data signal (signal voltage), which is inputted into the data signal line 15, is written into the pixel electrode 17 via the source electrode 9, the drain electrode 8 and the like. Note that a storage capacitor wire 18 (a Cs wire) functions as one of electrodes of a storage capacitor (an electrode under the storage capacitor), and the drain lead-out electrode 7 functions as the other electrode (an electrode on the storage capacitor). Further note that this storage capacitor is an auxiliary capacitor to maintain electrical potential written into the pixel electrode 17 until the next data signal is inputted into the pixel electrode 17.

In the active matrix substrate 10, as will be described below, the storage capacitor wire 18 and a gate insulating film (not illustrated) having a multi-layer structure (a first gate insulating layer and a second gate insulating layer) are formed on a substrate, and thereon, a semiconductor layer 24, the drain electrode 8 (with the drain lead-out wire 47 and also the drain lead-out electrode 7), an interlayer insulating film (not illustrated), and the pixel electrode 7 are formed in this order. Note that the drain lead-out electrode 7 is formed so as to be on the storage capacitor wire 18.

As illustrated in FIG. 3, an area 27 located on the storage capacitor wire 18 is an area where the first gate insulating film is not formed except an area 31, which is located in the area 27. That is to say, the gate insulating film is constituted by the first gate insulating layer and the second gate insulating layer in the area 31, and the gate insulating film is constituted by the second gate insulating layer in the area 27 except the area 31.

Accordingly, the gate insulating film of the active matrix substrate 10 according to the present invention includes a first thickness portion (constituted by the first gate insulating layer and the second gate insulating layer) overlapping with the area 31, a second thickness portion (constituted by the second gate insulating layer) overlapping with the area 27 except the area 31, and a third thickness portion (formed from the first gate insulating layer and the second gate insulating layer) located around the second thickness portion but not located below the drain lead-out electrode 7.

Moreover, the drain lead-out electrode 7 located on the storage capacitor wire 18 is partially hollowed so as to form a drain hollow portion 30 (a portion having no electrode). An opening of the contact hole 11 is formed in the area 31, and the drain hollow portion 30 is positioned so as to partially overlap with the contact hole 11. Further, the semiconductor layer 24 is formed to a position of the TFT 12 (see FIG. 1) so as to surround an area 37 where the drain hollow portion 30 overlaps with the opening of the contact hole 11.

FIG. 1 is a cross-sectional view taken along the line A-A' illustrated in FIG. 3. As illustrated in FIG. 1, the storage capacitor wire 18 is formed on a glass substrate 20, and a gate insulating film 40 is formed so as to cover a surface of the glass substrate, and the storage capacitor wire 18. The vicinity of the opening of the contact hole will be described below. Other than this, the drain lead-out electrode 7 (an area where the drain lead-out electrode 7 is located), a first interlayer insulating film 25, a second interlayer insulating film 26, and the pixel electrode 17 are formed on the gate insulating film 40 in this order.

The vicinity of the opening of the contact hole is the area 31 illustrated in FIG. 2, in which area the gate insulating film 40 is a first thickness portion 41 constituted by a first gate insulating layer 21 as an lower layer (nearer from the substrate), and a second gate insulating layer 22 as an upper layer. This first gate insulating layer 21 is made of, for example, an SOG (Spin On Glass) material. Then, the pixel electrode 17 that forms the contact hole 11 is formed directly and partially on the second gate insulating layer 22 of the first thickness portion 41, and the semiconductor layer 24 is formed so as to surround the pixel electrode 17. The drain lead-out electrode 7 lies on the semiconductor layer 24, and touches the pixel electrode 17 in the contact hole 11.

The following describes a structure below the opening of the contact hole 11 more specifically. In the active matrix substrate 10 according to the present invention, the drain lead-out electrode 7 has a multi-layer structure in which a lower layer (nearer from the substrate) is a first metal layer 7a made of Ti, and an upper layer is a second metal layer 7b made of Al. Further, the semiconductor layer 24 also has a multi-layer structure in which a lower layer (nearer from the substrate) is a high resistance semiconductor layer 24a (i layer) and an upper layer is a low resistance semiconductor layer 24b (n+ layer).

Below the opening of the contact hole 11, there are an area having neither drain lead-out electrode 7 nor semiconductor layer 24, and another area having both the drain lead-out electrode 7 and the semiconductor layer 24. The pixel electrode 17 directly touches the second gate insulating layer 22 in the area having neither drain lead-out electrode 7 nor the semiconductor layer 24. On the other hand, in another area having both the drain lead-out electrode 7 and the semiconductor layer 24, the high resistance semiconductor layer 24a (i layer), the low resistance semiconductor layer 24b (n+ layer), and the first metal layer 7a are formed on the second gate insulating layer 22 in this order.

Here, the second metal layer 7b (Al), which will cause electric corrosion with the pixel electrode (an ITO), is arranged not to be located below the opening of the contact hole 11. In short, below the opening of the contact hole 11, there are (i) an area where the drain lead-out electrode 7 is entirely extracted, and (ii) another area where only the first metal layer 7a (Ti) is left on the semiconductor layer 24, so that this first metal layer 7a is arranged such that its edge surface and upper surface touch the pixel electrode 17. Note that in a case where the second metal layer is removed, there is a possibility that a left portion thereof forms into a taper shape downwardly so that the pixel electrode breaks in the contact hole. Therefore, below the opening of the contact hole, there is the arrangement described above so as to prevent this.

Figure 11:
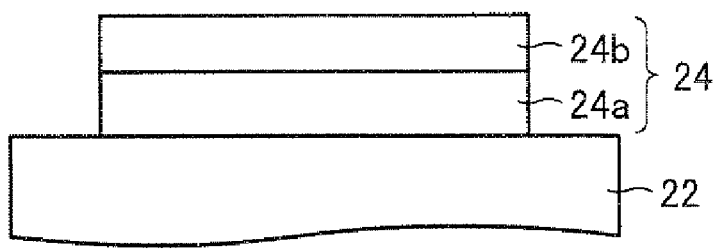
FIG. 11(a) is an explanatory view for explaining an effect of lowering contact resistance in accordance with the first and second embodiments.
FIG. 11(b) is an explanatory view for explaining the effect of lowering contact resistance in accordance with the first and second embodiments.
Figure 11:
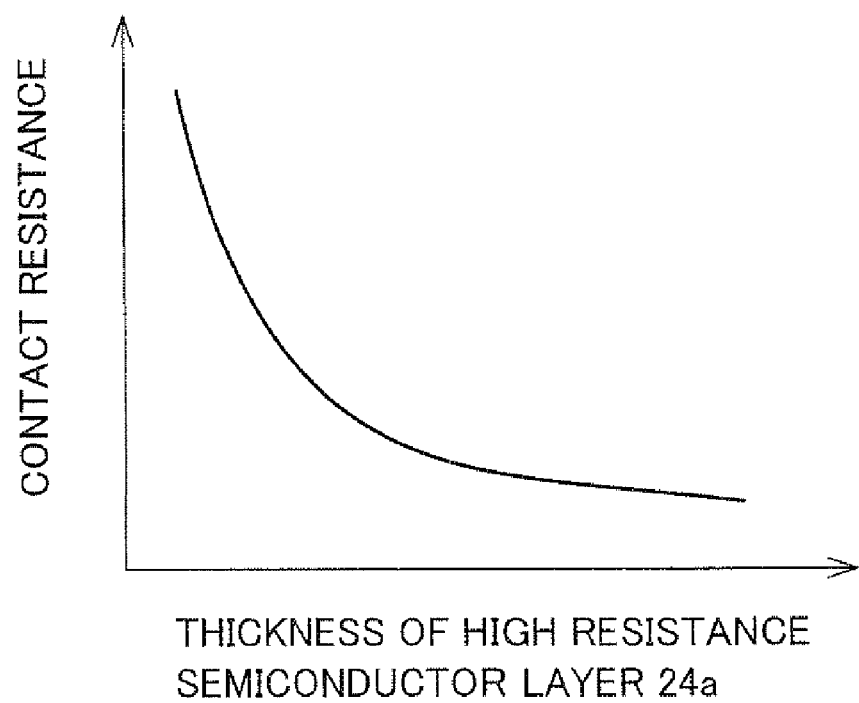

Moreover, below the opening of the contact hole 11, the high resistance semiconductor layer 24a (i layer), the low resistance semiconductor layer 24b (n+ layer), and the first metal layer 7a are laminated so as to make it possible to reduce contact resistance. As illustrated in FIGS. 11(a) and 11(b), the high resistance semiconductor layer 24a with a thicker thickness provides a lower contact resistance. As such, it is preferable to make the high resistance semiconductor layer 24a thicker than the low resistance semiconductor layer 24b. For example, the thickness of the high resistance semiconductor layer 24a may be in a range from 1300 Å to 1800 Å, while the thickness of the low resistance semiconductor layer 24b may be 400 Å.

Further, a second thickness portion 42 located around the first thickness portion 41 is constituted by only the second gate insulating layer 22, and the drain lead-out electrode 7, a first interlayer insulating film 25, a second interlayer insulating film 26 and the pixel electrode 17 are formed on this second gate insulating layer 22 in this order. Furthermore, a third thickness portion 43, which is located around the second thickness portion 42 but not below the drain lead-out electrode 7, is constituted by the first gate insulating layer 21 and the second gate insulating layer 22, and the first interlayer insulating film 25, the second interlayer insulating film 26 and the pixel electrode 17 are formed on this second gate insulating layer 22 in this order.

As illustrated in FIG. 1(b), a driver connecting terminal 45, which is to be connected with various signal lines (such as the scanning signal line 16), is provided to the edge of the active matrix substrate 10 in accordance with the present invention. The driver connecting terminal 45 is used to connect various signal lines to a driver (for example, a gate driver) for driving the signal lines, and is formed, as well as the signal lines (for example, the scanning signal line), on a substrate 20. Along with the process for manufacturing the active matrix substrate, the gate insulating film (the second gate insulating layer 22) and the interlayer insulating film (the first interlayer insulating film 25 and the second interlayer insulating film 26) are formed on the driver connecting terminal 45. These are etched away so that the driver connecting terminal 45 is exposed outside.

Here, this etching is carried out concurrently with another etching for forming the contact hole 11. That is, this etching and another etching are carried out in a single step (the etching step). In this etching step, the etching is carried out from the interlayer insulating film up to the second gate insulating layer 22 in an area where the driver connecting terminal 45 is to be exposed, and is carried out from the interlayer insulating film up to the high resistance semiconductor layer 24a in another area below the opening of the contact hole 11, in which area the drain lead-out electrode 7 is not located. The high resistance semiconductor layer (i layer) for decelerating the etching is temporarily formed to the area below the opening of the contact hole 11, in which area the drain lead-out electrode 7 is not located (see FIG. 1(a)), and then, is removed in the aforementioned etching step.

According to the present embodiment, below the opening of the contact hole 11 (where the drain lead-out electrode 7 is not located), there is the first gate insulating layer 21 under the second gate insulating layer 22. Thus, even if the etching does not stop at the high resistance semiconductor layer, and the second gate insulating layer 22 is also removed, the first gate insulating layer 21 thereunder successfully prevents a serious defect of a short-circuit between the drain lead-out electrode 7 (the pixel electrode 17) and the storage capacitor wire 18.

Moreover, in the area where the contact hole 11 is formed even if the high resistance semiconductor layer for decelerating the etching is made thin, there is no possibility of an occurrence of the short-circuit between the drain lead-out electrode 7 (the pixel electrode 17) and the storage capacitor wire 18, because there is the first gate insulating layer 21 below the second gate insulating layer 22. As such, it is possible to arbitrarily design (shorten) a thickness of another high resistance semiconductor layer that is to become a channel of the TFT 12, which high resistance semiconductor layer and this high resistance semiconductor layer (for decelerating the etching) are simultaneously formed. This improves characteristics of the TFT 12. Moreover, as illustrated in FIG. 1(a) and FIG. 2, a thin film portion 13 is formed to the gate insulating film 40 in an area where the gate insulating film 40 overlaps the semiconductor layer 24 of the TFT 12, which thin film portion 13 is thinner than its surrounding area. The first gate insulating layer 21 has been removed from this thin film portion 13 so that this thin film portion 13, as well as the second thickness portion 42, is constituted by only the second gate insulating layer 22.

The following describes an example of a method for manufacturing the active matrix substrate 10 according to the present invention.

Firstly, the scanning signal line 16 is formed on the substrate 20, which is a transparent insulating substrate made of glass, plastic or the like. Namely, (i) a metal film made of titanium, chrome, aluminum, molybdenum, tantalum, tungsten, copper or the like, (ii) an alloy film of these metals, or (iii) a laminated film of these metals is formed with the use of a spattering method or the like. And then, this film is patterned along with a desired shape with the use of, for example, a photo etching method which includes the steps of resist coating, exposure, resist separation (development), etching gate metal where resist is not left, removing resist, and the like.

After that, the first gate insulating layer 21 is formed. For example, a coating is carried out with a Spin On Glass material (an SOG material) with the use of a spin coat method or the like so that the first gate insulating layer 21 is formed. The first insulating layer 21 is made of an SOG material in the present embodiment, but may be made of an insulating material (for example, a material including an organic matter). The SOG material is a material that can be formed into a glass film (a silica film) with the use of a coating method such as the spin coat method. Other than the SOG materials, examples of materials including an organic matter encompass an acryl resin material, epoxy resin, polyimido resin, polyurethane resin, polysiloxane resin, novolac resin, and the like.

The first gate insulating layer 21 is preferably made of the SOG material, especially a spin on glass material including the organic matter (which is an organic SOG material). Among the organic SOG materials, an SOG material based on a Si—O—C bond or a Si—C bond is particularly preferable. The organic SOG material has low relative permittivity, and it is easy to form a thick film. That is to say, with the use of the organic SOG material, it becomes possible to (i) lower relative permittivity of the first gate insulating layer 21 so as to easily form it thick, and also (ii) level it (with the use of the organic SOG material, it is easy to (i) lower the relative permittivity of the first gate insulating layer 21, at the same time, (ii) form it into a thick film, and (iii) have a leveling effect). Note that, as the SOG material based on the Si—O—C bond, the following materials are also applicable: materials disclosed in Japanese Unexamined Patent Application Publication No. 2001-98224, materials disclosed in Japanese Unexamined Patent Application Publication No. 6-240455, and DD1100 manufactured by Dow Corning Toray Silicone Co., Ltd, and disclosed in IDW' 03 Abstracts, P 617. Further, as a material based on the Si—C bond, a material disclosed in Japanese Unexamined Patent Application Publication No. 10-102003 is also applicable.

Further, the first gate insulating layer 21 may be made of an organic SOG material which includes silica fillers therein. In this case, it is preferable to arrange that the silica fillers are dispersed in a substrate which is made of an organic SOG material. With this arrangement, it becomes possible to form the first gate insulating layer 21 with no crack, even when the substrate 20 is large in size. A diameter of a particle of silica filler is, for example, in the range from 10 nm to 30 nm, and its mix rate is in the range from 20% to 80% in volume. As the organic SOG material including the silica fillers, for example, an LNT-025 manufactured by NIPPON SYOKUBAI Co., Ltd is applicable.

Then, the first gate insulating layer 21 is patterned as a prescribed shape with the use of the photo etching method or the like. Specifically, the first gate insulating layer 21 is removed in an area where the TFT 12 is formed (especially in the vicinity of the channel section), and in another area where the storage capacitor wire 18 is formed. The patterning is carried out such that the gate insulating layer 21 should be left (should not be removed) in an area where the first gate insulating layer 21 overlaps with the contact hole 11 on the storage capacitor wire 18.

After that, the second gate insulating layer 22 and the semiconductor layer 24 are formed sequentially with the use of a plasma CVD (chemical vapor deposition) method or the like, and then, patterned with the photo etching method or the like. As illustrated in FIG. 1(a), this semiconductor layer 24 is made of amorphous silicon, polysilicon or the like, and has a laminated structure of the high resistance semiconductor layer 24a (i layer) formed on the second gate insulating layer 22, and the low resistance semiconductor layer 24b (n+ layer) made of n+ amorphous silicon or the like, which low resistance semiconductor layer is formed on the high resistance semiconductor layer 24a. According to the present embodiment, the semiconductor layer 24 is left in the area where the contact hole 11 is formed (see FIG. 1(a)). However, as will be described below, it is not necessary to keep the semiconductor layer 24.

Next, the data signal line 15, the drain lead-out wire 47, the drain lead-out electrode 7, the source electrode 9, and the drain electrode 8 are formed in a single step. The data signal line 15, the drain lead-out wire 47, and the drain lead-out electrode 7 are formed in such a manner that (i) a metal film made of titanium, chrome, aluminum, molybdenum, tantalum, tungsten, copper or the like, (ii) an alloy film of these metal, or (iii) a laminated film of these metal is formed with the use of the spattering method or the like, and patterned along with a desired shape with the photo etching method or the like.

Then, channel etching is carried out by carrying out dry etching with respect to the high resistance semiconductor layer 24a (i layer) made of amorphous silicon or the like, and the low resistance semiconductor layer 24b (n+ layer) made of n+ amorphous silicon or the like, with a mask which is made along patterns of the data signal line, the source electrode 9, the drain electrode 8, the drain lead-out wire 47, and the drain lead-out electrode 7. In this process, a thickness of the i layer 24a is suitably set, and the TFT 12 is formed. That is to say, uncovered areas of the semiconductor layer 24 at the data signal line 15, the source electrode 9, the drain electrode 8, the drain lead-out wire 47, and the drain lead-out electrode 7 are etched away so that the i layer retains a thickness required for the TFT 12 to work. According to the present embodiment, the high resistance semiconductor layer 24a and the low resistance semiconductor layer 24b are left in the area where the contact hole 11 is formed, so that the high resistance semiconductor layer 24a is left in an area where the drain electrode is not formed.

Further, the interlayer insulating film is formed. The interlayer insulating film may have either a single layer structure or a laminated structure. According to the present embodiment, first of all, as the first interlayer insulating film 25, an inorganic insulating film of nitride silicon, oxide silicon or the like is formed with the use of the plasma CVD method or the like, so as to protect the TFT 12. Furthermore, as the second interlayer insulating film 26, a coating of a photosensitive organic insulating film is carried out with a photosensitive organic insulating film with the use of a spin coat method or the like so that the interlayer insulating film has a two layer structure. Thereby, coupling capacity between the layers is reduced.

A hole is made in the area where the contact hole 11 is formed, which hole penetrates the first interlayer insulating film 25 and the second interlayer insulating film 26 (according to circumstances, additionally, the second gate insulating layer 22 is penetrated partially or entirely). According to the present embodiment, exposure, and removal of a photo sensitive organic insulating film is carried out with respect to the second interlayer insulating film 26 that acts as a photosensitive organic insulating film. In this process, the first interlayer insulating film 25 as an inorganic insulating film and the second gate insulating layer 22, both of which are located below the second interlayer insulating film 26, are etched away along with a pattern of the photosensitive organic insulating film (the second interlayer insulating film 26). In this step, the etching proceeds slowly because the high resistance semiconductor layer 24a is left. This causes the second gate insulating layer 22 to be left entirely or partially.

After that, with the use of a wet etching method or the like, the second metal layer 7b (aluminum), which has been exposed in the aforementioned process of forming the hole, is removed with the use of the interlayer insulating film 25 as a mask, so that a lower layer (the second metal layer 7a) of the drain electrode 7 located below the opening of the contact hole 11 is exposed. Then, the pixel electrode 17 is film-formed with the use of the spattering method or the like, and is patterned along with a desired pattern with the use of the photo etching method or the like. In this way, the active matrix substrate 10 is produced.

According to the present embodiment, below the opening of the contact hole, there are the area where the drain lead-out electrode 7 is formed, and another area where the drain lead-out electrode is hollowed. Further, an upper layer (the second metal layer 7b made of aluminum) of the drain lead-out electrode 7 is removed so that the lower layer (the first metal layer 7a) is exposed. Further, this metal layer 7a is arranged to touch the pixel electrode 17. With this arrangement, there are at least two sections in the contact hole 11, which sections are (i) a section laminated with the first gate insulating layer 21, the second gate insulating layer 22, and the pixel electrode 17 in the order of from the glass substrate 20, and (ii) another section laminated with the first gate insulating layer 21, the second gate insulating layer 22, i layer 24a, n+ layer 24b, the drain lead-out electrode 7 (the first metal layer 7a), and the pixel electrode 17 in the order of from the glass substrate 20. As such, the pixel electrode 17 (an ITO) and aluminum are prevented from touching each other so that electric corrosion hardly occurs.

According to the present embodiment, below the opening of the contact hole, the high resistance semiconductor layer 24a and the low resistance semiconductor layer 24b are formed temporarily, and the drain lead-out electrode 7 is formed on a part of them. In the area where the drain lead-out electrode 7 is not formed, the low resistance semiconductor layer is removed by the channel etching, and the high resistance semiconductor layer is also etched away in the etching carried out with respect to the interlayer insulating film. Thereby, the second gate insulating layer 22 is left. The first gate insulating layer 21 is positioned below the opening of the contact hole. Thus, even when the second gate insulating layer 22 is also removed because of irregularity of a thickness of the high resistance semiconductor layer, there is no possibility that the drain lead-out electrode 7 (or the pixel electrode 17) and the storage capacitor wire 18 are electrically connected with each other. As such, the first gate insulating layer 21 may be formed at least directly below the area where the drain lead-out electrode 7 is hollowed below the opening of the contact hole.

In a case where the interlayer insulating film has a multi-layer structure constituted by a plurality of interlayer insulating films that have different film characteristics respectively, and the contact hole 11 has a square shape as in the present embodiment, and a side of the opening of the contact hole 11 is, for example, 8 μm, a side (a side of the square) of the first gate insulating layer 21 may be 10 μm by taking into consideration an exposure position and accidental errors in an end result.

In a case where the interlayer insulating film has a single layer structure, and the contact hole 11 has a square shape, and a side of the opening of the contact hole 11 is, for example, 3 μm, a side (a side of the square) of the first gate insulating layer 21 may be 5 μm by taking into consideration the exposure position and the accidental errors of the end result.

Further, in a case where the interlayer insulating film has a single layer structure, a width of the storage capacitor wire 18 (a storage capacitor electrode)) which has a storage capacitor function and a light shielding function, may be, for example, 10 μm. In a case where the interlayer insulating film has a multi-layer structure as described above, the width of the storage capacitor wire 18 may be 28 μm, for example.

Figure 4:
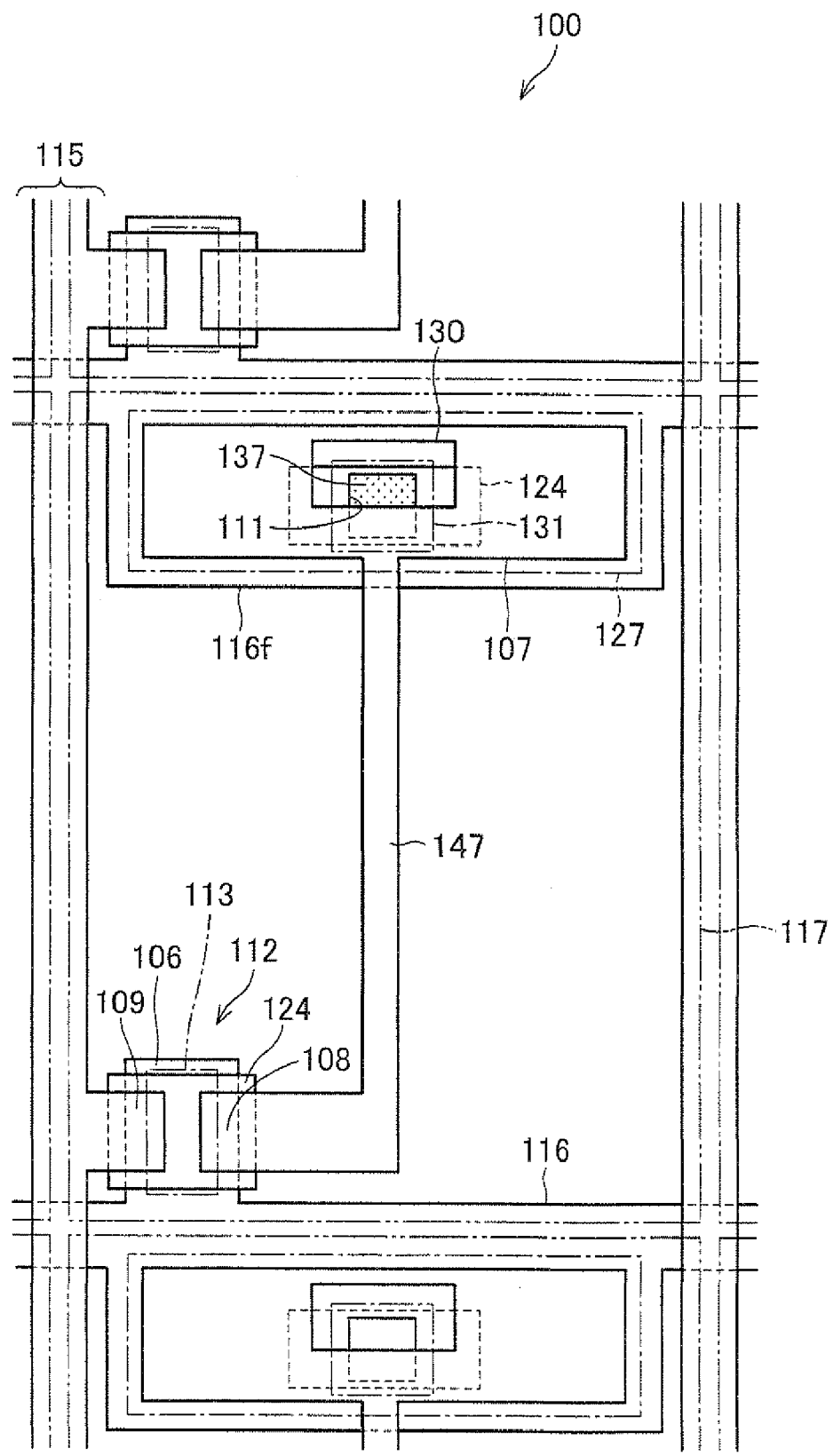
FIG. 4 is a plan view illustrating another arrangement of the active matrix substrate in accordance with the first embodiment.
Figure 5:
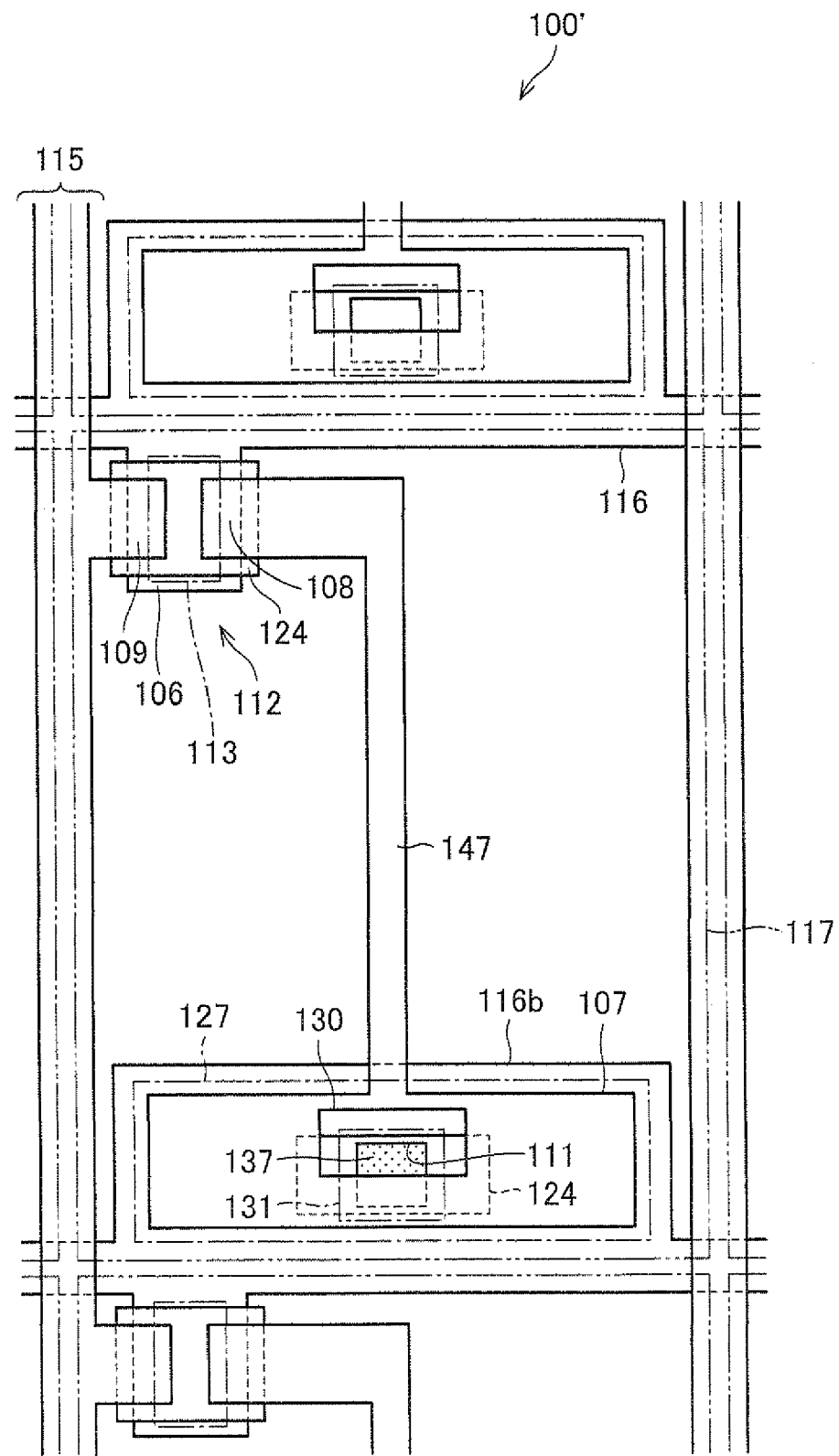
FIG. 5 is a plan view illustrating still another arrangement of the active matrix substrate in accordance with the first embodiment.

It is also possible to constitute the active matrix substrate in accordance with the present invention as illustrated in FIGS. 4 and 5. That is to say, the upstream or downstream scanning signal line is arranged to function as one of the electrodes of the storage capacitor. An active matrix substrate 100 according to the present invention, illustrated in FIG. 4, includes a scanning signal line 116, a data signal line 115, a TFT 112 formed in the vicinity of each intersection of the signal lines (115, 116), and a pixel electrode 117. The TFT 112 includes a source electrode 109 connected with the date signal line 115, and a drain electrode 108 connected with the pixel electrode 117 via a drain lead-out wire 147, a drain lead-out electrode 107, and a contact hole 111. Further, a gate electrode 106 of the TFT 112 is lead out from the scanning signal line 116.

In the active matrix substrate 100, an upstream scanning signal line 116f functions as one of the electrodes of the storage capacitor (an electrode under the storage capacitor), and the drain lead-out electrode 107 functions as the other electrode of the storage capacitor (an electrode on the storage capacitor).

In the active matrix 100, as will be described below, the scanning signal line 116f and a gate insulating film (not illustrated) having a multi-layer structure (the first gate insulating layer and the second gate insulating layer) are formed on a substrate, and thereon, a semiconductor layer 124, the drain electrode 108 (with the drain lead-out wire 147 and the drain lead-out electrode 107), the interlayer insulating film (not illustrated), and the pixel electrode 117 are formed in this order. The drain lead-out electrode 107 is formed so as to be located on the upstream scanning signal line 116f.

As illustrated in FIG. 4, an area 127 located on the upstream scanning signal line 116f is an area where the first gate insulating layer is not formed except an area 131, which is located in the area 127. That is to say, the gate insulating film is constituted by the first gate insulating layer and the second gate insulating layer in the area 131, and is constituted by the second gate insulating layer in the area 127 except the area 131.

Accordingly, the gate insulating film of the active matrix substrate 100 according to the present invention includes a first thickness portion (constituted by the first gate insulating layer and the second insulating layer) overlapping with the area 131, a second thickness portion (constituted by only the second gate insulating layer) overlapping the area 127 except the area 131, and a third thickness portion (constituted by the first gate insulating layer and the second gate insulating layer) located around the second thickness portion but not located below the drain lead-out electrode 107.

Further, the drain lead-out electrode 107 located on the upstream scanning signal line 116f is partially hollowed so as to form a drain hollow portion 130 (a portion having no electrode). An opening of the contact hole 111 is formed in the area 131, and the drain hollow portion 130 is positioned so as to partially overlap with the contact hole 111. Furthermore, the semiconductor layer 124 is formed to the TFT 112 (see FIG. 1), and also is formed so as to surround an area 137 where the drain hollow portion 130 and the opening of the contact hole 111 overlap with each other.

The following explains a structure below the opening of the contact hole 111 more specifically. In the active matrix substrate 100 according to the present invention, the drain lead-out electrode 107 has a multi-layer structure in which a lower layer (nearer from the substrate) is a first metal layer made of Ti, and an upper layer is a second metal layer made of Al. Moreover, the semiconductor layer 124 also has a multi-layer structure in which a lower layer (nearer from the substrate) is a high resistance semiconductor layer (i layer), and an upper layer is a low resistance semiconductor layer (n+ layer).

Below the opening of the contact hole 111, there are (i) an area where neither drain lead-out electrode 107 nor semiconductor layer 124 is formed, and (ii) another area where both the drain lead-out electrode 107 and the semiconductor layer 124 are formed. The pixel electrode 117 directly touches the second gate insulating layer in the area where neither the drain lead-out electrode 107 nor the semiconductor layer 124 is formed. On the other hand, in the area where both the drain lead-out electrode 107 and the semiconductor layer 124 are formed, the high resistance semiconductor layer (i layer), the low resistance semiconductor layer (n+ layer), and the first metal layer are formed on the second gate insulating layer in this order.

Note that the second thickness portion located around the first thickness portion is constituted by only the second gate insulating layer, and the drain lead-out electrode 107, the interlayer insulating film, and the pixel electrode 117 are formed on this second gate insulating layer in this order. Further, the third thickness portion, which is located around the second thickness portion but not below the drain lead-out electrode 107, is constituted by the first gate insulating layer and the second gate insulating layer, and the interlayer insulating film and the pixel electrode 117 are formed on this second gate insulating layer in this order.

According to the present embodiment, even if the etching is carried out up to the second gate insulating layer below the opening of the contact hole 111 (the area where no drain lead-out electrode 107 is formed), there is the first gate insulating layer below the second gate insulating layer so as to prevent a significant defect of a short-circuit between the drain lead-out electrode 107 (the pixel electrode 117) and the upstream scanning signal line 116f. Moreover, according to the present embodiment, the semiconductor layer 124 is arranged to be left in the area where the contact hole is formed, so that it is possible to control a depth of the contact hole when it is formed. Thereby, it becomes possible to successfully prevent the aforementioned short-circuit. Further, the semiconductor layer 124 can have a laminated structure in which the high resistance semiconductor layer and the low resistance semiconductor layer are laminated, which high resistance semiconductor layer is nearer from the gate insulating film than the low resistance semiconductor layer, so as to reduce contact resistance.

Furthermore, there is the first gate insulating layer below the second gate insulating layer in the area where the contact hole 111 is formed so that there could not be an occurrence of the short-circuit between the drain lead-out electrode 107 (the pixel electrode 117) and the upstream scanning signal line 116f, even when the semiconductor layer 124, which has a function of decelerating the etching, is made thin. As such, it becomes possible to arbitrarily design (shorten) a thickness of another semiconductor layer that is to become the channel of the TFT, which semiconductor layer and this semiconductor layer 124 are simultaneously formed. This results in an improvement in characteristics of the TFT. As illustrated in FIG. 4, a thin film portion 113, which is thinner than its surrounding area, is formed to the gate insulating film of the active matrix substrate 100 in an area where the gate insulating film overlaps with the semiconductor layer 124 of the TFT 112. This thin film portion 113, where the first gate insulating layer has been removed, is constituted by only the second gate insulating layer, as well as the second thickness portion.

Further, an active matrix substrate 100' according to the present invention, illustrated in FIG. 5, has an arrangement in which a downstream scanning signal line 116b functions as one of the electrodes of the storage capacitor (an electrode under the storage capacitor). Other than this, the active matrix substrate 100' has the same arrangements and effects as the substrate illustrated in FIG. 4.

With the arrangements illustrated in FIGS. 4 and 5, it is not necessary to form the storage capacitor wire. Thus, it becomes possible to reduce a risk of a short-circuit between each gate metal, and a burnout rate. It is also possible to raise an opening rate of a pixel.

Furthermore, the gate insulating layer has a two layer structure in the present embodiment, however, the present invention is not limited to this, provided that the gate insulating layer has a multi-layer structure. Moreover, the present embodiment has an arrangement of the TFT illustrated in FIGS. 2, 4 and 5. Note however that this is for explanatory convenience, and the present invention is not limited to this.

Second Embodiment

Figure 6:
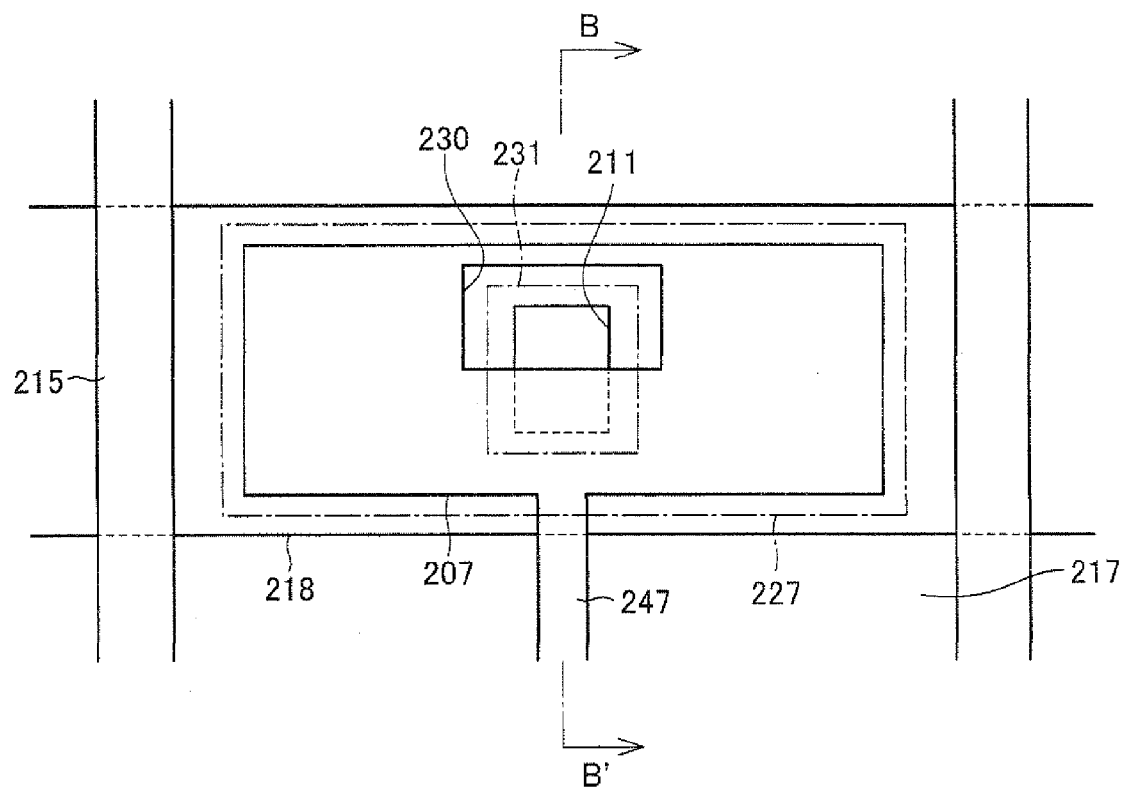
FIG. 6(a) is a plan view illustrating an arrangement of the main part of an active matrix substrate in accordance with a second embodiment.
FIG. 6(b) is a cross-sectional view illustrating an edge structure of the active matrix substrate illustrated in FIG. 6(a).
Figure 6:
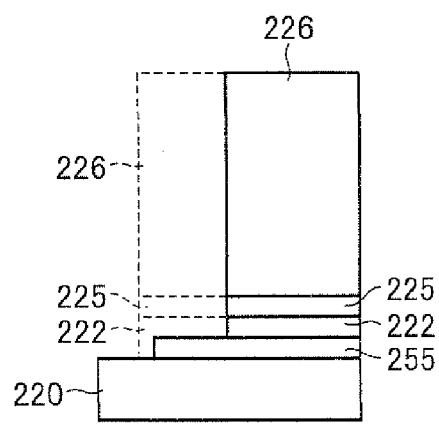
Figure 7:
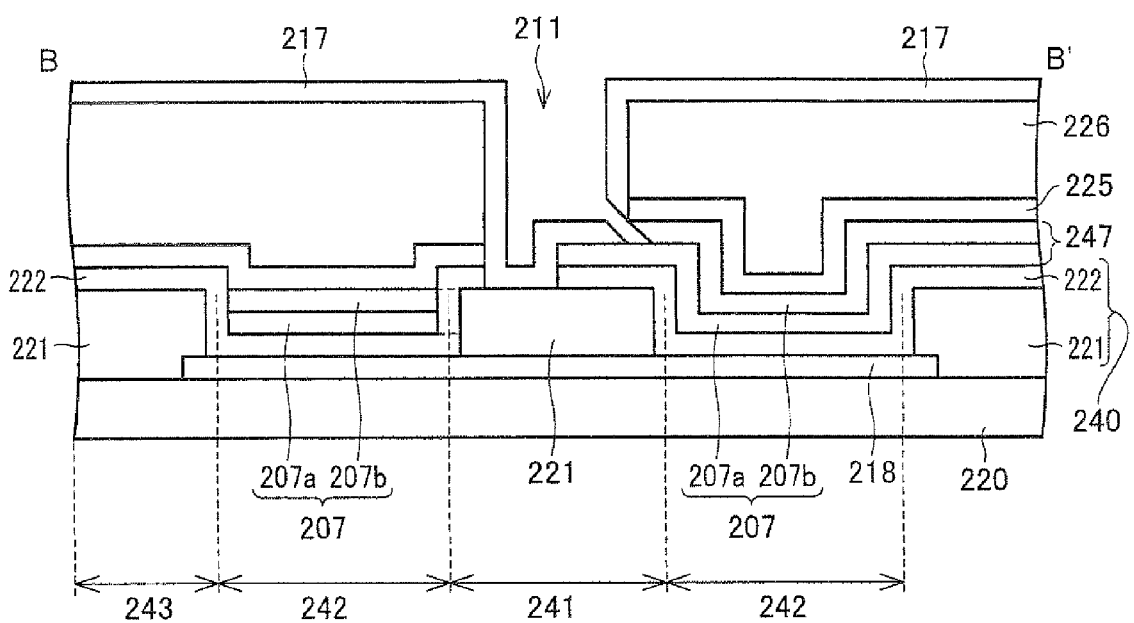
FIG. 7 is a cross-sectional view illustrating the active matrix substrate illustrated in FIG. 6.

The following description deals with the second embodiment of the present invention with reference to FIGS. 6(a), 6(b) and 7.

FIG. 6(a) is an enlarged view illustrating the vicinity of the storage capacitor wire of the active matrix substrate in accordance with the present embodiment, and FIG. 7 is a cross-sectional view taken along the line B-B' in FIG. 6(a).

In the active matrix substrate according to the present invention, as will be described below, a storage capacitor wire 218 and the gate insulating film (not illustrated) having a multi-layer structure (a first gate insulating layer and a second gate insulating layer) is formed on a substrate, and thereon, a drain electrode (with a drain lead-out wire 247 and a drain lead-out electrode 207), an interlayer insulating film (not illustrated), and a pixel electrode 217 are formed in this order. The drain lead-out electrode 207 is formed so as to be located on the storage capacitor wire 218.

As illustrated in FIG. 6(a), an area 227 located on the storage capacitor wire 218 is an area where the first gate insulating layer is not formed except an area 231, which is located in the area 227. That is to say, the gate insulating film is constituted by the first gate insulating layer and the second insulating layer in the area 231, and is constituted by only the second gate insulating layer in the area 227 except the area 231.

As such, the gate insulating film of the active matrix substrate according to the present invention includes a first thickness portion (constituted by the first gate insulating layer and the second gate insulating layer) overlapping with the area 231, a second thickness portion (constituted by the second gate insulating layer) overlapping with the area 227 except the area 231, and a third thickness portion (constituted by the first gate insulating layer and the second gate insulating layer) located around the second thickness portion but not below the drain lead-out electrode 207.

Further, the drain lead-out electrode 207 located on the storage capacitor wire 218 is partially hollowed so as to form a drain hollow portion 230 (a portion having no electrode). Note that an opening of a contact hole 211 is formed in the area 231, and the drain hollow portion 230 is positioned so as to partially overlap the contact hole 211. As such, according to the second embodiment, unlike the first embodiment, a semiconductor layer is not formed in the vicinity of the contact hole.

As illustrated in FIG. 7, the storage capacitor wire 218 is formed on a glass substrate 220, and a gate insulating film 240 is formed so as to cover a surface of the glass substrate, and the storage capacitor wire 218. An arrangement below the vicinity of the opening of the contact hole 211 will be described below. Other than this, the drain lead-out electrode 207 (an area where the drain lead-out electrode 7 is formed), a first interlayer insulating film 225, a second interlayer insulating film 226, and the pixel electrode 217 are formed on the gate insulating film 240 in this order.

The vicinity of the contact hole 211 is the area 231 illustrated in FIG. 6(a), and the gate insulating film 240 in this area is a first thickness portion 241. The first thickness portion 241 includes (i) one part having a two layer structure in which the first gate insulating layer 221 and the second gate insulating layer 222 are laminated, and (ii) the other part having a single layer structure of the first gate insulating layer 221. A part of the pixel electrode 217 forming the contact hole 211 is directly formed on the single layer structure part, and the drain lead-out electrode 207 lies on the two layer structure part so as to touch the pixel electrode 217 in the contact hole 211. The first gate insulating layer 221 is made of, for example, an SOG (Spin On Glass) material.

The following description deals with the arrangement below the opening of the contact hole 211 more specifically. In the active matrix substrate according to the present invention, the drain lead-out electrode 207 has a multi-layer structure in which a lower layer is a first metal layer 207a made of Ti, and an upper layer is a second metal layer 207b made of Al. Below the opening of the contact hole 211, there are an area where no drain lead-out electrode 207 is formed, and another area where the drain lead-out electrode 207 is formed The pixel electrode 217 directly touches the first gate insulating layer 221 (because the second gate insulating layer 222 is etched away) in the area where no drain lead-out electrode 207 is formed. On the other hand, in the area where the drain lead-out electrode 207 is formed, the second gate insulating layer 222 is left (because the drain lead-out electrode act as an etching stopper) so that there are the second gate insulating layer 222 and the first gate insulating layer 221 below the first metal layer 207a. Here, a second metal layer 207b (Al), which will cause electric corrosion with the pixel electrode (an ITO), is arranged not to be below the opening of the contact hole 211. That is to say, below the opening of the contact hole 211, there are an area where the drain lead-out electrode does not exist completely, and another area where only the first metal layer 207a (Ti) of the drain lead-out electrode 207 is left on the second gate insulating layer 222. An edge surface and an upper surface of this first metal layer 207a are arranged to touch the pixel electrode 217. In a case where the second metal layer is removed, there is a possibility that a left portion thereof has an inversely tapered shape that would cause breakage in the pixel electrode in the contact hole. However, this does not occur due to the arrangement below the opening of the contact hole 211, as described above.

Moreover, a second thickness portion 242 located around the first thickness portion 241 is constituted by only the second gate insulating layer 222, and the drain lead-out electrode 207, the first interlayer insulating film 225, the second interlayer insulating film 226 and the pixel electrode 217 are formed on this second gate insulating layer 222 in this order. Further, a third thickness portion 243, which is located around the second thickness portion 242 but not below the drain lead-out electrode 207, is constituted by the first gate insulating layer 221 and the second gate insulating layer 222, and the first interlayer insulating film 225, the second interlayer insulating film 226 and the pixel electrode 217 are formed on this second gate insulating layer 222 in this order.

As illustrated in FIG. 6(b), a driver connecting terminal 255, which is to be connected with various signal lines (such as a scanning signal line and a data signal line), is provided to an edge of the active matrix substrate in accordance with the present invention. This driver connecting terminal 255 is used to connect a driver (such as a gate driver) for driving various signal lines (such as the scanning signal line), with the various signal lines, and formed, as well as the various signal lines, on the substrate 220. Along with the process for manufacturing the active matrix substrate, the gate insulating film (the second gate insulating layer 222) and the interlayer insulating film (the first interlayer insulating film 225 and the second interlayer insulating film 226) are formed on the driver connecting terminal 225. These are etched away so as to expose the driver connecting terminal 225 outside.

And then, this etching is carried out simultaneously with another etching for forming the contact hole 211 in a single step (an etching step). In this etching step, the etching is carried out from the second interlayer insulating film 226 up to the second gate insulating layer 222 in an area where the driver connecting terminal 255 is to be exposed, and is carried out from the second interlayer insulating film 226 up to the second gate insulating layer 222 in another area below the opening of the contact hole (the area where no drain lead-out electrode 207 is formed).

According to the present embodiment, there is the first gate insulating layer 221 below the opening of the contact hole (the area where no drain lead-out electrode 207 is formed). Thus, even if the etching proceeds up to the bottom of the second gate insulating layer 222, it is possible to successfully prevent a significant defect of a short-circuit between the drain lead-out electrode 207 (the pixel electrode 217) and the storage capacitor wire 218.

Further, the semiconductor layer is not formed to the area where the contact hole is formed so that it becomes possible to arbitrarily design a thickness of another semiconductor layer in an area where a TFT is provided (in an area to become a channel). This improves characteristics of the TFT.

Figure 8:
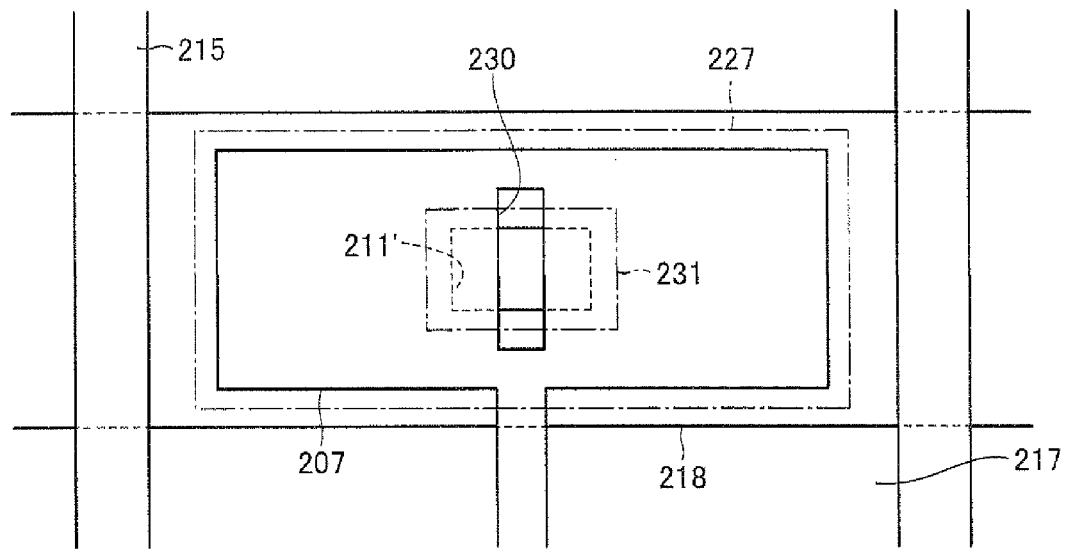
FIG. 8 is a plan view illustrating another arrangement of the active matrix substrate in accordance with the second embodiment.

Note that it is also possible to transform the arrangement illustrated in FIG. 6(a) into the one illustrated in FIG. 8. That is to say, an opening of a contact hole 211' is formed into a rectangular shape in the area 231, a longitudinal direction of which rectangular shape is a direction of the scanning signal line (not illustrated), and the drain hollow portion 230 (a portion having no electrode) is formed into another rectangular shape so as to intersect (preferably orthogonalize with) the opening of the contact hole 211', a longitudinal direction of which another rectangular shape is a direction of the data signal line. With this arrangement, even if the drain hollow portion 230 (the portion having no electrode) and the contact hole 211' becomes out of alignment, fluctuation in a range of a contact area can be prevented or suppressed.

Note that the active matrix substrate in accordance with the second embodiment can be made with the use of the same method (except the process for manufacturing the semiconductor layer) as in the first embodiment.

Third Embodiment

Figure 9:
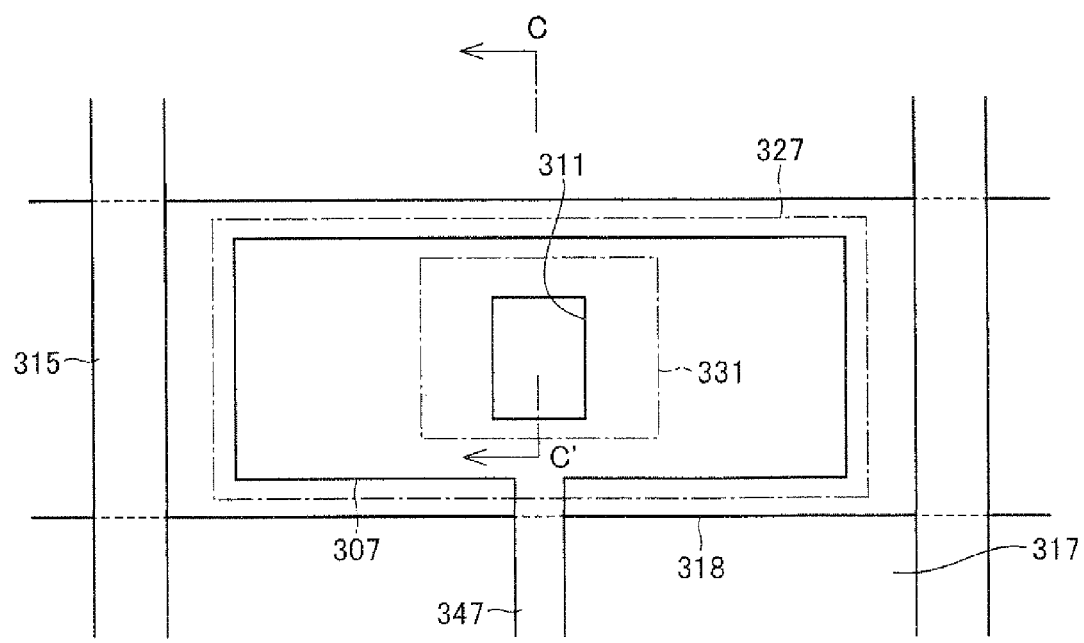
FIG. 9 is a plan view illustrating an arrangement of a main part of an active matrix substrate in accordance with a third embodiment.
Figure 10:
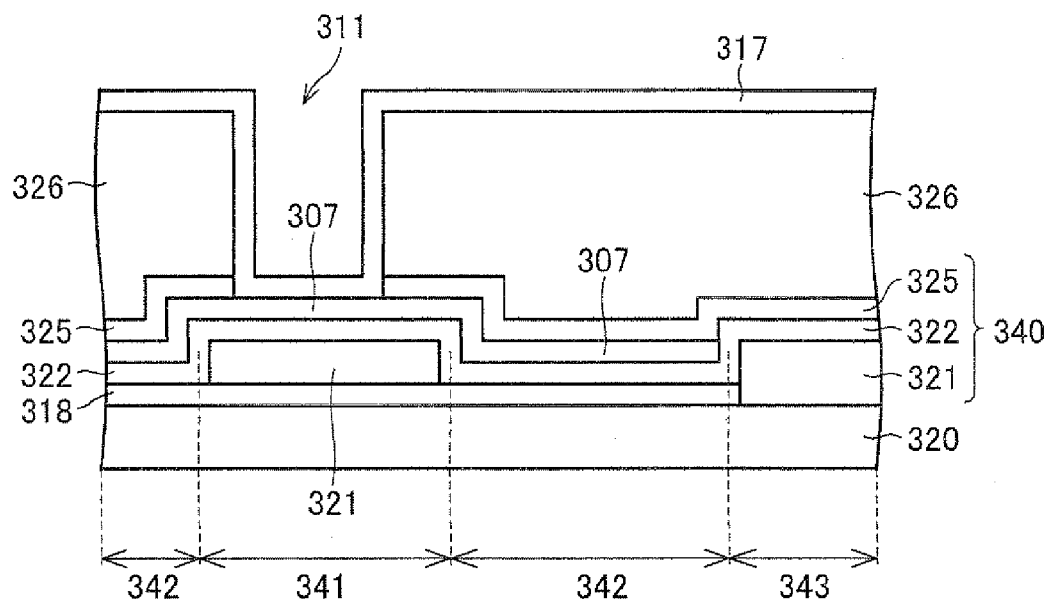
FIG. 10(a) is a cross-sectional view illustrating the active matrix substrate illustrated in FIG. 9.
FIG. 10(b) is a cross-sectional view illustrating an edge of the active matrix substrate illustrated in FIG. 10(a).
Figure 10:
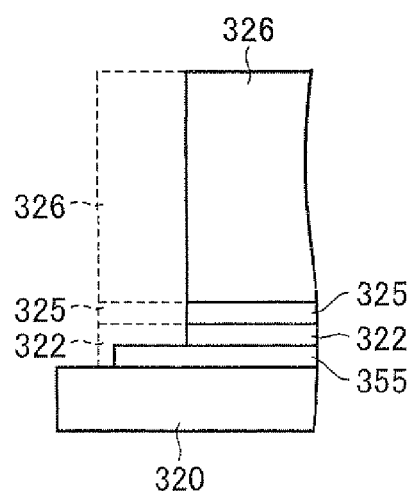

The following description deals with the third embodiment of the present invention with reference to FIGS. 9, 10(a) and 10(b).

FIG. 9 is an enlarged view illustrating the vicinity of a storage capacitor wire of an active matrix substrate in accordance with the present invention, and FIG. 10(a) is a cross-sectional view taken along line C-C' illustrated in FIG. 9.

In the active matrix substrate according to the present invention, as will be described below, a storage capacitor wire 318 and a gate insulating film (not illustrated) having a multi-layer structure (a first gate insulating layer and a second gate insulating layer) are formed, and thereon, a drain electrode (with a drain lead-out electrode wire 347 and a drain lead-out electrode 307), an interlayer insulating film (not illustrated), and a pixel electrode 317 are formed in this order. The drain lead-out electrode 307 is formed so as to be on the storage capacitor wire 318.

As illustrated in FIG. 9, an area 327 located above the storage capacitor wire 318 is an area where the first gate insulating layer is not formed except an area 331, which is located in the area 327. That is to say, the gate insulating film is constituted by the first gate insulating layer and the second gate insulating layer in the area 331, and is constituted by the second gate insulating layer in the area 327 except the area 331.

Accordingly, the gate insulating film 340 of the active matrix substrate according to the present invention includes a first thickness portion (constituted by the first gate insulating layer and the second gate insulating layer) overlapping with the area 331, a second thickness portion (constituted by the second gate insulating layer) overlapping the area 327 except the area 331, and a third thickness portion (constituted by the first gate insulating layer and the second gate insulating layer) located around the second thickness portion but not below the drain lead-out electrode 307. An opening of a contact hole 311 is formed in this area 331.

Note that, according to the third embodiment, unlike the first and second embodiments, no drain hollow portion is formed to the drain lead-out electrode 307, and the drain lead-out electrode 307 is formed to all over an area below (below the bottom of) the contact hole 311.

FIG. 10(a) is a cross-sectional view taken along line C-C' illustrated in FIG. 9. As illustrated in FIG. 10(a), the storage capacitor wire 318 is formed on a glass substrate 320, and the gate insulating film 340 is formed so as to cover a surface of the glass substrate, and the storage capacitor wire 318. An arrangement below the vicinity of the opening of the contact hole will be described below. Other than this, the drain lead-out electrode 307 (an area where the drain lead-out electrode is formed), the first interlayer insulating film 325, the second interlayer insulating film 326, and the pixel electrode 317 are formed on the gate insulating film 340 in this order.

The vicinity of the opening of the contact hole is the area 331 illustrated in FIG. 9, and the gate insulating film 340 in this area is a first thickness portion 341 constituted by a first gate insulating layer 321, which is a lower layer (nearer from the substrate), and a second gate insulating layer 322, which is an upper layer. This first gate insulating layer 321 is made of, for example, an SOG (Spin On Glass) material.

According to the present embodiment, the drain lead-out electrode is not hollowed so that the drain lead-out electrode 307 is formed on all over the second gate insulating layer 322 of the first thickness portion 341. The pixel electrode 317 forming the contact hole 311 is formed on this drain lead-out electrode 307.

Further, a second thickness portion 342 located around the first thickness portion 341 is constituted by only the second gate insulating layer 322, and the drain lead-out electrode 307, the first interlayer insulating film 325, the second interlayer insulating film 326 and the pixel electrode 317 are formed on this second gate insulating layer 322 in this order. Furthermore, a third thickness portion 343 located around the second thickness portion 342 but not below the drain lead-out electrode 307 is constituted by the first gate insulating layer 321 and the second gate insulating layer 322, and the first interlayer insulating film 325, the second interlayer insulating film 326 and the pixel electrode 317 are formed on this second gate insulating layer 322 in this order.

As illustrated in FIG. 10(b), a driver connecting terminal 355, which is to be connected with various signal lines (such as a scanning signal line and a data signal line), is provided to an edge of the active matrix substrate in accordance with the present invention. This driver connecting terminal 355 is used to connect a driver (such as a gate driver) for driving various signal lines, with the various signal lines, and is formed, as well as the various signal lines, on a substrate 320. Along with the process for manufacturing the active matrix substrate, the gate insulating film (the second gate insulating layer 322) and the interlayer insulating film (the first interlayer insulating film 325 and the second interlayer insulating film 326) are formed on the driver connecting terminal 355. These are etched away so as to expose the driver connecting terminal 355 outside.

And then, this etching is carried out simultaneously with another etching for forming the contact hole 311 in a single step (an etching step). That is to say, in this etching step, the etching is carried out from the second interlayer insulating film 326 up to the second gate insulating layer 322 in an area where the driver connecting terminal 355 is to be exposed, and the etching is carried out from the interlayer insulating films 325 and 326 up to the drain lead-out electrode 307 in an area where the contact hole is to be formed.

According to the present embodiment, even if the drain lead-out electrode 307 located below the contact hole has a formation defect, such as a pinhole, and the etching is carried out up to the second gate insulating layer 322, there is the first gate insulating layer 321 thereunder so as to prevent a significant defect of a short-circuit between the drain lead-out electrode 307 (the pixel electrode 317) and the storage capacitor wire 318.

Any active matrix substrate manufactured in the aforementioned embodiments, and a color filter substrate are bonded together, and then liquid crystal is introduced and sealed between them, so that a liquid crystal panel is made. The color filter substrate includes colored layers respectively of either red, green, or blue, being formed in matrix so that each color layer respectively corresponds to each pixel of the active matrix substrate, and a black matrix being formed between each color layer and having a light blocking effect. This liquid crystal panel is connected with a driver (a liquid crystal driving LSI) and the like, and then, is provided with a polarizing board, a backlight and the like, so that a liquid crystal display device in accordance with the present invention is formed. Further, the black matrix is preferably positioned to correspond to the area where the contact hole is formed.

Note that the present invention is not limited to the liquid crystal display device. For example, it is also possible to constitute an organic EL display device by (i) positioning a color filter substrate and the active matrix substrate in accordance with the present invention to face each other, and then (ii) positioning an organic EL layer between them so as to make an organic EL panel, thereafter, (iii) connecting an outward lead-out terminal of the panel to a driver and the like. Further, the present invention is applicable to not only the liquid crystal display device and the organic EL display device but also other display devices as long as they are made of an active matrix substrate.

The following describes a liquid crystal display device according to the present embodiment.

Figure 12:
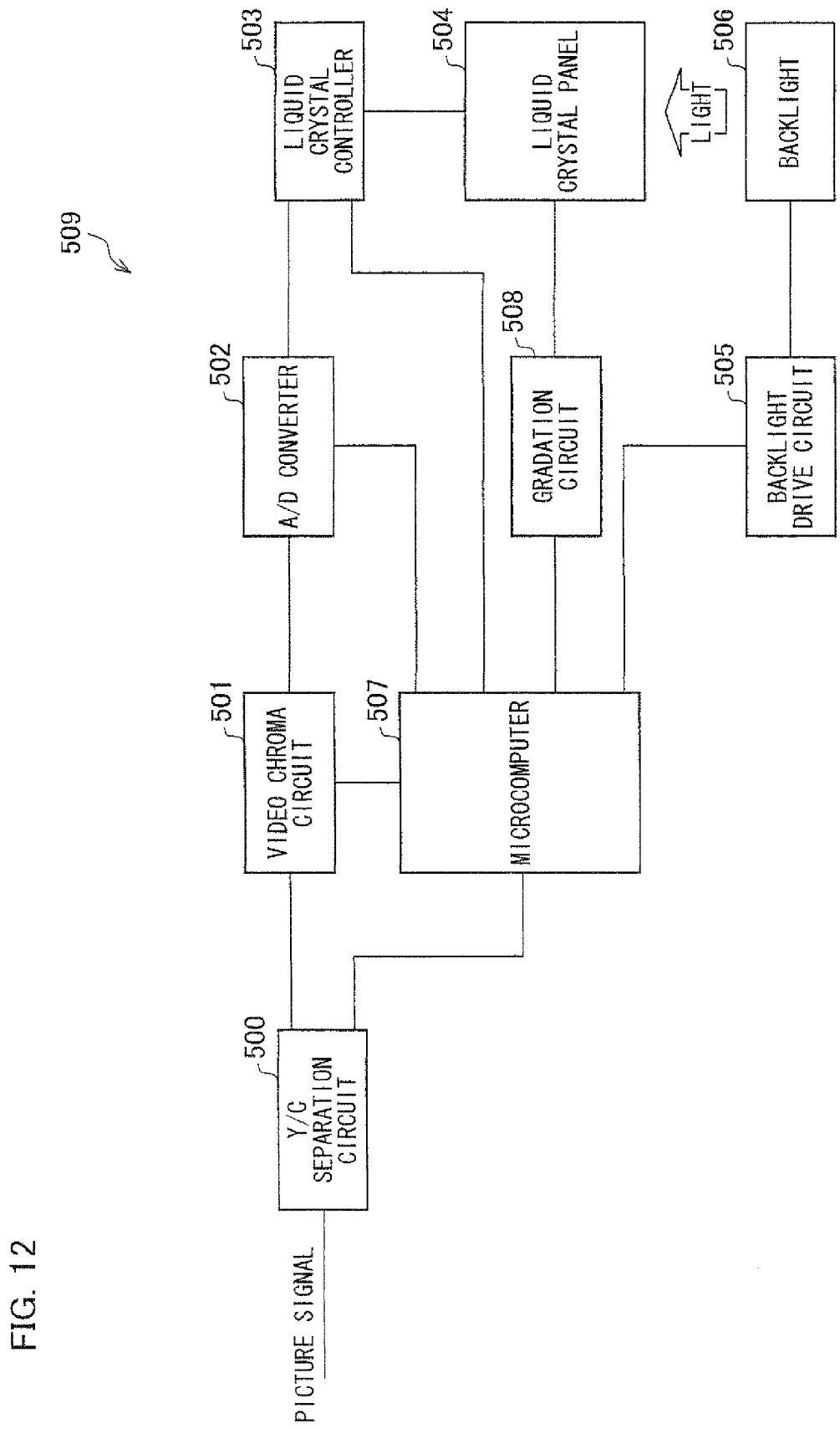
FIG. 12 is a block diagram illustrating a structure for controlling a liquid crystal panel in accordance with the present embodiment.

FIG. 12 is a block diagram schematically illustrating an arrangement of a liquid crystal display device 509 in accordance with the present invention. As illustrated in FIG. 12, the liquid crystal display device 509 includes an Y/C separation circuit 500, a video chroma circuit 501, an A/D converter 502, a liquid crystal controller 503, a liquid crystal panel 504 including the active matrix substrate in accordance with the present invention, a backlight drive circuit 505, a backlight 506, microcomputer 507, and a gradation circuit 508.

A picture signal, a video signal and the like (hereinafter, referred to as the picture signal for brevity), each of which is to be displayed by the liquid crystal display device 509, are inputted into the Y/C separation circuit 500, and then separated into a luminance signal and a color signal. These luminance signal and color signal are converted, at the video chroma circuit 501, into analogue KGB signals, which correspond to three primary colors R, G and B. Then, the analogue KGB signals are converted into digital KGB signals by the A/D converter, and after that, are inputted into the liquid crystal controller 503.

These digital RGB signals inputted into the liquid crystal controller 503 are further inputted from the controller 503 into the liquid crystal panel 504. The digital RGB signals from the liquid crystal controller 503 are inputted into the liquid crystal panel 504 at a prescribed timing, and at the same time, gradation voltages of R, G and B are provided to the liquid crystal panel 504 from the gradation circuit 508. Further, the backlight 506 is driven by the backlight drive circuit 505 so as to irradiate the liquid crystal panel 504 with light. This allows the liquid crystal panel 504 to display pictures and images. The microcomputer 507 controls a whole system of the liquid crystal display device 509, including these processings described above.

Examples of the picture signal described above encompass a picture signal based on a television broadcast, a picture signal taken with a video camera, a picture signal provided via the Internet, and other various picture signals.

Figure 13:
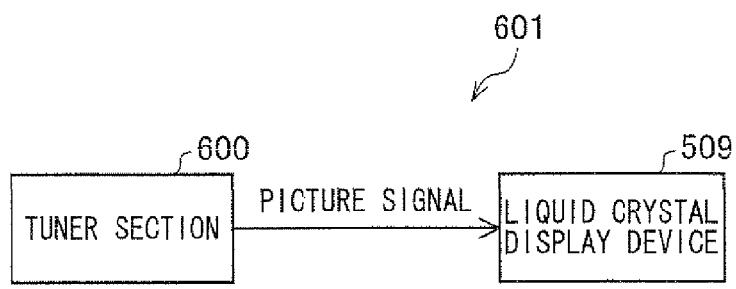
FIG. 13 is a block diagram illustrating an arrangement of a television receiver in accordance with the present embodiment.

Furthermore, as illustrated in FIG. 13, the liquid crystal display device 509 according to the present invention is connected with a tuner section 600 which receives the television broadcast and outputs the picture signal, so as to make it possible to display pictures (images) in accordance with the picture signal outputted from the tuner section 600. In this case, a television receiver 601 is made of the liquid crystal display device 509 and the tuner section 600.

Figure 14:
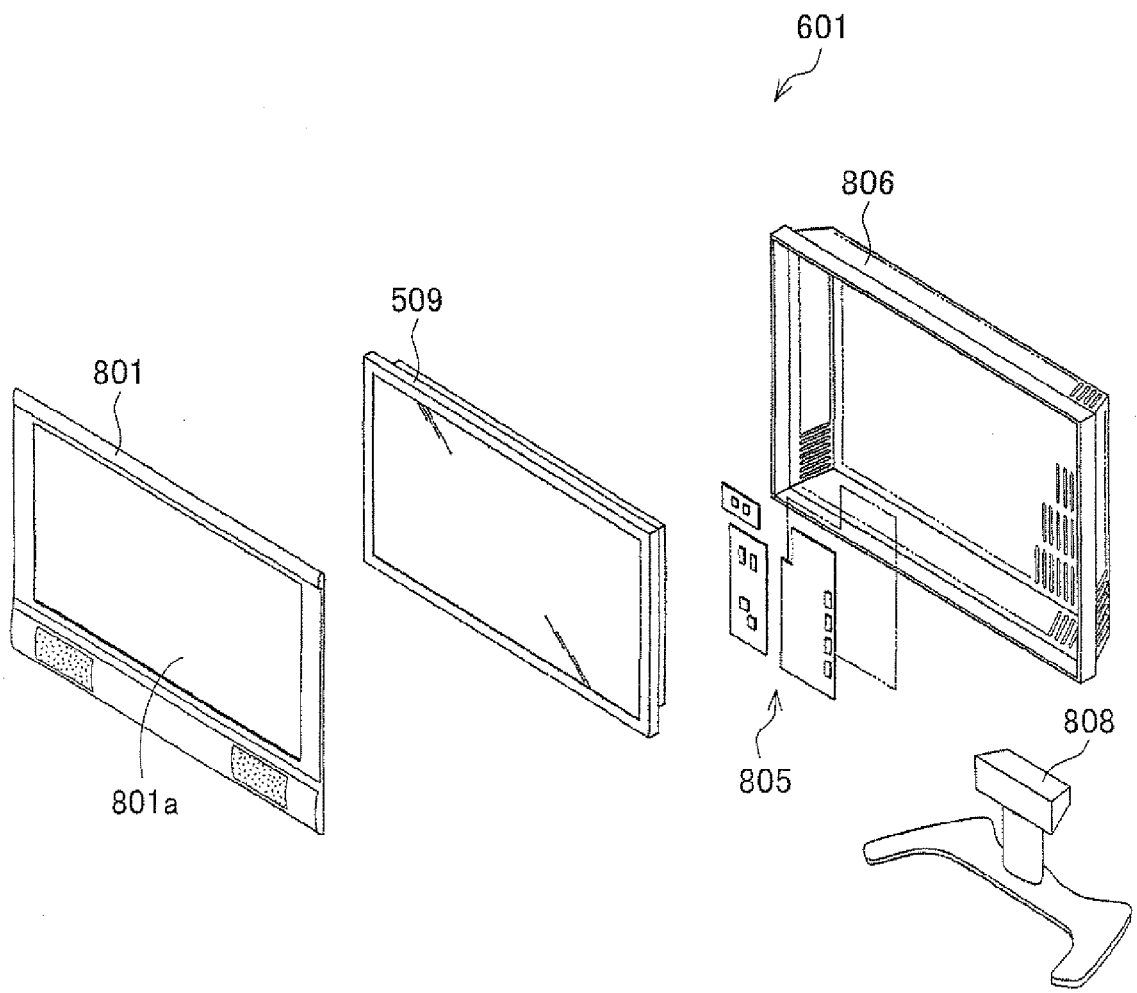
FIG. 14 is a perspective view illustrating an arrangement of the television receiver in accordance with the present embodiment of the present invention.
Figure 15:
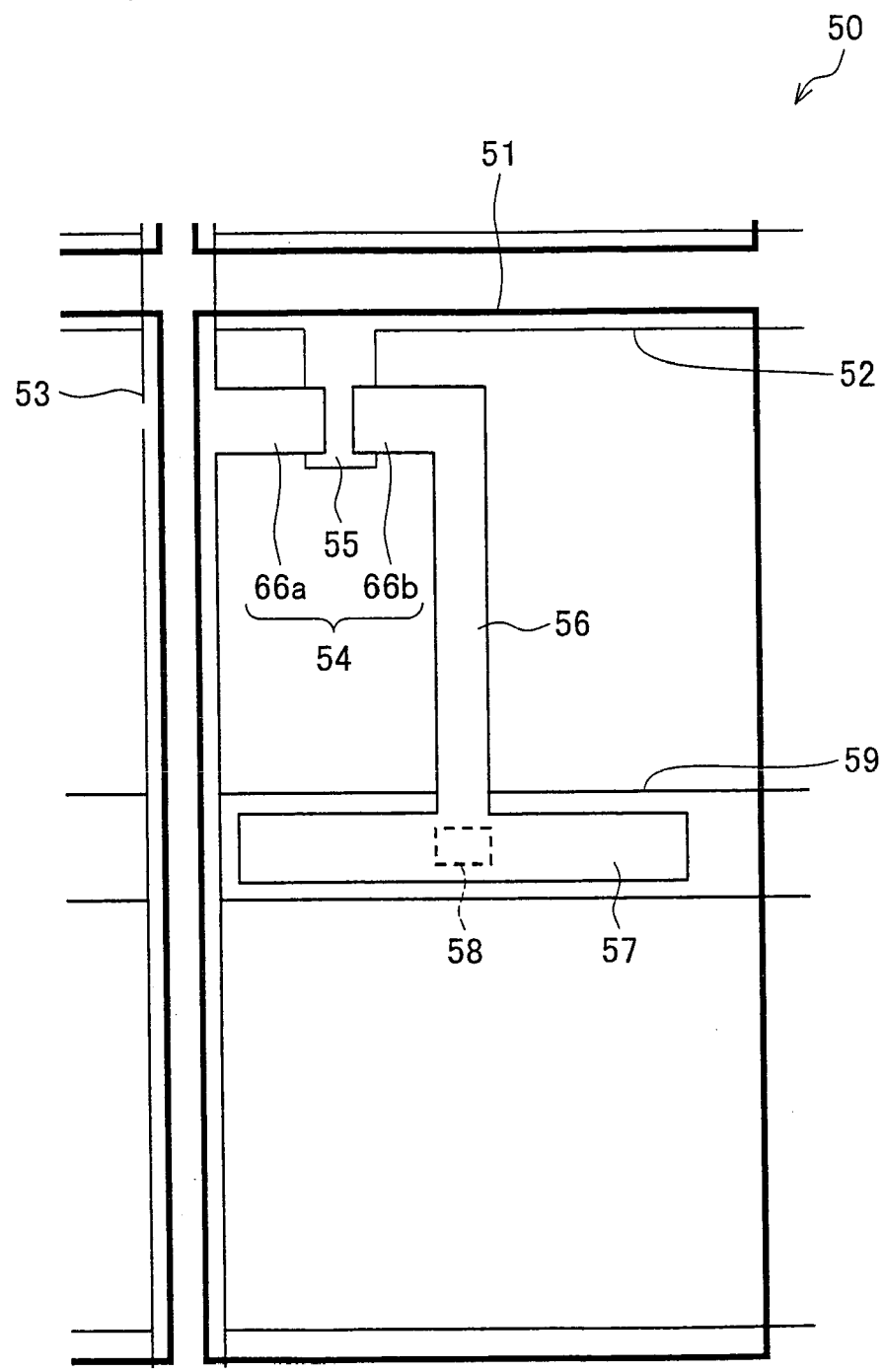
FIG. 15 is a plan view illustrating an arrangement of a conventional active matrix substrate.

In a case where the liquid crystal display device is used in the television receiver 601, for example, as illustrated in FIG. 14, a first housing 801 and a second housing 806 covers the liquid crystal display device 509 therebetween, and hold it. The first housing 801 includes an opening portion 801a for transmitting the images displayed at the liquid crystal display device 509. Further, the second housing 806 covers a backside of the liquid crystal display device 509, and includes a control circuit 805 for controlling the liquid crystal display device 509, and a supporting member 808 attached thereunder.

The present invention is applicable to the liquid crystal display device illustrated in FIG. 12, however is also applicable to other display devices, such as an organic EL display device.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The active matrix substrate according to the present invention is preferably applicable to a liquid crystal display device, for example.

The invention claimed is:

1. An active matrix substrate including, in each pixel area, a transistor, a pixel electrode, a conductive member functioning as one of electrodes of a storage capacitor, a drain lead-out electrode connected to a drain electrode of the transistor, and overlapping with the conductive member, and a contact hole for connecting the drain lead-out electrode to the pixel electrode, comprising:
  a gate insulating film covering a gate electrode of each transistor, and the conductive member, the gate insulating film comprising:
  a first thickness portion overlapping with at least part of the contact hole;
  a second thickness portion formed adjacent to the first thickness portion, and overlapping with the drain lead-out electrode,
  the first thickness portion having a greater thickness than the second thickness portion, and
  wherein the first thickness portion is constituted by the first and second gate insulating films, and the second thickness portion is constituted by the second gate insulating film.

2. The active matrix substrate according to claim 1, wherein the conductive member is a storage capacitor wire.

3. The active matrix substrate according to claim 1, wherein the conductive member is an upstream or downstream scanning signal line.

4. The active matrix substrate according to claim 1, wherein, below an opening of the contact hole, there are an area where the drain lead-out electrode is formed, and another area where no drain lead-out electrode is formed.

5. The active matrix substrate according to claim 4, wherein:
  the drain lead-out electrode has a laminated structure in which a first metal layer and a second metal layer are laminated; and
  in the contact hole, the first metal layer touches the pixel electrode but the second metal layer does not touch the pixel electrode.

6. The active matrix substrate according to claim 5, wherein the first metal layer is formed on the gate insulating film with a semiconductor layer therebetween in the area where the drain lead-out electrode is formed.

7. The active matrix substrate according to claim 6, wherein the semiconductor layer has a laminated structure in which a high resistance semiconductor layer and a low resistance semiconductor layer are laminated, which high resistance semiconductor layer is located nearer from the gate insulating film than the low resistance semiconductor layer.

8. The active matrix substrate according to claim 5, wherein the first metal layer is formed directly on the gate insulating film in the area where the drain lead-out electrode is formed.

9. The active matrix substrate according to claim 5, wherein the second metal layer is made of Al.

10. The active matrix substrate according to claim 1, comprising:
  a driver connecting terminal connected with the conductive member or various signal lines, the contact hole being formed in a single etching step for etching the gate insulating film and an interlayer insulating film away to expose the driver connecting terminal and for etching to form the contact hole, the gate insulating film and an interlayer insulating film being located above the driver connecting terminal.

11. A display device comprising an active matrix substrate according to claim 1.

12. A television receiver comprising:
a display device according to claim 11; and
a tuner section for receiving a television broadcast.

13. An active matrix substrate including, in each pixel area, a transistor, a pixel electrode, a conductive member functioning as one of electrodes of a storage capacitor, a drain lead-out electrode connected to a drain electrode of the transistor, and overlapping with the conductive member, and a contact hole for connecting the drain lead-out electrode to the pixel electrode, comprising:
   a gate insulating film covering a gate electrode of each transistor, and the conductive member, the gate insulating film comprising:
   a first thickness portion overlapping with at least part of the contact hole;
   a second thickness portion formed adjacent to the first thickness portion, and overlapping with the drain lead-out electrode;
   the first thickness portion having a greater thickness than the second thickness portion; and
   a third thickness portion not overlapping with the drain lead-out electrode, the second thickness portion having a thinner thickness than the third thickness portion.

14. An active matrix substrate including, in each pixel area, a transistor, a pixel electrode, a conductive member functioning as one of electrodes of a storage capacitor, a drain lead-out electrode connected to a drain electrode of the transistor, and overlapping with the conductive member, and a contact hole for connecting the drain lead-out electrode to the pixel electrode, comprising:
   a gate insulating film covering a gate electrode of each transistor, and the conductive member, the gate insulating film comprising:
   a first thickness portion overlapping with at least part of the contact hole;
   a second thickness portion formed adjacent to the first thickness portion, and overlapping with the drain lead-out electrode;
   the first thickness portion having a greater thickness than the second thickness portion; and
   wherein the gate insulating film is constituted by a plurality of gate insulating layers, and the second thickness portion has more than one gate insulating layer, and the first thickness portion has more gate insulating layers than the second thickness portion.

15. The active matrix substrate according to claim 14, wherein the gate insulating layer includes an organic matter.

* * * * *